United States Patent [19]

Flurry et al.

[11] 4,245,152
[45] Jan. 13, 1981

[54] DECODING METHOD AND SYSTEM FOR ETAB BAR CODE

[75] Inventors: Gregory A. Flurry; Marvin P. Smoak, both of Lexington, Ky.

[73] Assignee: International Business Machines Corporation, Armonk, N.Y.

[21] Appl. No.: 87,605

[22] Filed: Oct. 23, 1979

[51] Int. Cl.³ .................. G06K 7/10; G06K 19/04; G06K 9/00
[52] U.S. Cl. .................. 235/463; 235/462; 235/466; 340/146.3 Z
[58] Field of Search ............ 235/463, 466, 454, 458, 235/462, 482, 474; 340/149 A, 146.3 Z, 152, 146.3 K; 250/566, 568, 569; 346/78, 80; 360/51

[56] References Cited

U.S. PATENT DOCUMENTS

| | | | |
|---|---|---|---|
| 3,723,710 | 3/1973 | Crouse | 235/463 |
| 3,763,351 | 10/1973 | Deerhake | 235/463 |
| 3,860,792 | 1/1975 | Myren | 235/462 |
| 3,882,301 | 5/1975 | Nassimbene | 340/146.3 Z |
| 3,891,831 | 6/1975 | Coles | 340/146.3 Z |
| 3,979,577 | 9/1976 | Seligman | 235/463 |

OTHER PUBLICATIONS

Phillips & Ross-*ETAB Bar Code*, IBM Tech. Disc. Bull., vol. 21, No. 7, Dec. 1978, pp. 2883-2884.
Drew and Jones-*Increased Density Self-Clocking Bar Code*, IBM Tech. Disc. Bull., vol. 13, No. 10, p. 3181, Mar. 1971.

*Primary Examiner*—Robert M. Kilgore

[57] ABSTRACT

A high density bar code scanned to be read out provides a time varying analog electric signal which after being reshaped is decoded, i.e., converted into a binary bit representation based on distances measured between consecutive leading and consecutive trailing edges of the reshaped analog signal. Errors due to mismeasurements are minimized by using a decoding process based on comparison of each measuring distance to a first or to a second preset threshold level. The choice of the threshold to be used for decoding a given bit depends on the odd or even characteristic of the number of bits previously decoded on the same bit stream. In addition, at least one of the thresholds is dynamically readjusted throughout the process, based on the last measured distance.

13 Claims, 21 Drawing Figures

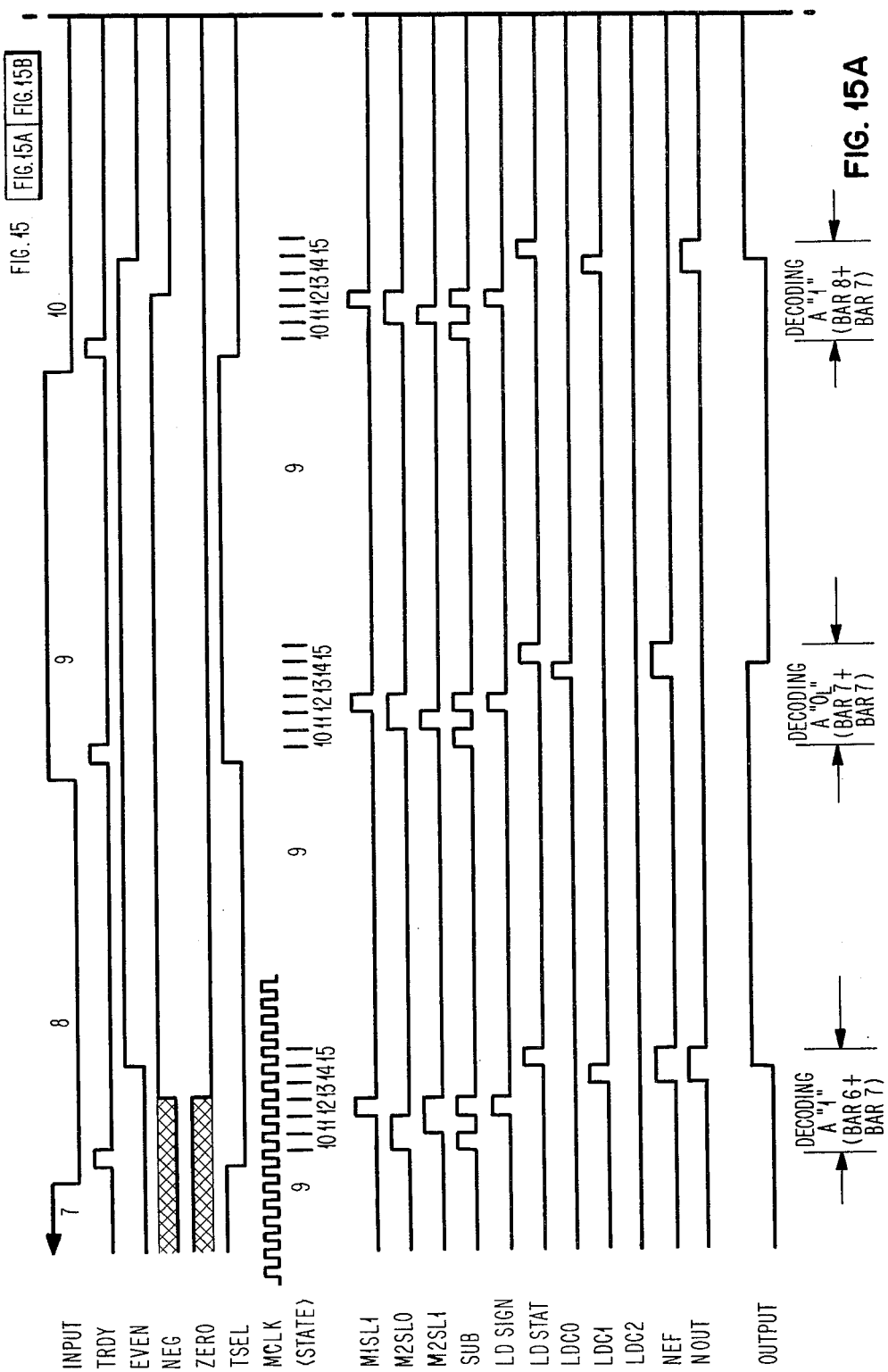

DECODING METHOD AND SYSTEM FOR ETAB BAR CODE

BACKGROUND OF THE INVENTION

1. Field of the Invention

The invention relates to data encoding and more particularly to a method and device for reading a high density self-clocking bar code.

2. Background of the Invention

The recent development of low cost LSI circuit technology lead to a boost in microprocessor applications. Data can now be processed at a competitive cost. But prior to any processing said data should be collected and methods should be available for coding and decoding these data. Several coding methods have already been proposed among which probably the most commonly used is the so called bar coding method. According to this method, the information to be coded is converted into printed rectangular marks and spaces, the respective width of which bear the coded information. For instance, account references are printed on checks using such a method; similarly prices and stock references are printed on tags stuck to the goods carried by supermarkets, etc. . . . Optic or magnetic readers are then used to read this information, convert it into binary coded data, and then feed the latter into a data processing system which balances the customer's account, establishes money transfers and or bills and executes all kind of data processing operations at increased rates and reliability, but lower costs.

Since the code is based on the widths of marks and spaces reading is performed by scanning the printed document either by hand or by machine propelled means. In both cases, accuracy and reliability of decoding rely on the sensitivity of the decoding means used to scanning speed variations, i.e. on their ability to decode properly under varying scanning conditions. In addition, most applications require high density printed bar codes, which adds to the decoding difficulties, since mark and space dimensions become smaller and smaller.

Several types of factors may be acted upon to improve bar coding reliability. Some deal with the type of code itself. In that respect, a significant improvement is achieved with codes such as the one disclosed in U.S. Pat. No. 3,723,710 assigned to the same assignee as this application, as well as the one disclosed in IBM Technical Disclosure Bulletin, Vol. 21, No. 7, December 1978, pages 2883-2884. The latter deals with the so called Every-Transition-A-Bit (ETAB) bar code. Other factors to be acted upon relate to the decoding means which might be made more accurate by improving both the decoding process and the decoding equipment.

SUMMARY OF THE INVENTION

It is a principle object of this invention to provide an improved decoding process for high density bar coded information.

Another object of this invention is to provide an improved process for decoding ETAB bar code.

Still another object of the invention is to provide a device for implementing said process.

Accordingly, the invention contemplates means for dynamically decoding graphic bar coded information coded such that three relative distances between consecutive similar transitions from mark to space and space to mark are used to characterize the binary coded data in such a manner that one distance is used to code the binary one and two distances, i.e., one long and one short, to code the binary zero, said means being characterized in that it includes measuring means for measuring distances between consecutive similar transitions, i.e. from mark to space or space to mark, and means for decoding the current bit based on the distance measurements, by comparing the distance relative to the current bit to a first or to a second dynamic threshold depending whether the number of previously decoded 1 bits was odd or even and then discriminating between a short zero bit, a one bit and a long zero bit based on the type of threshold used and the result of corresponding comparison.

The foregoing and other objects, features and advantages of the invention will be apparent from the following more particular description of preferred embodiments of the invention, as illustrated in the accompanying drawings.

BRIEF DESCRIPTION OF THE DRAWINGS

FIGS. 14, 15A and 15B are time diagrams showing the operation of the decoding process of the invention.

DETAILED DESCRIPTION OF THE INVENTION

Figure 1A:
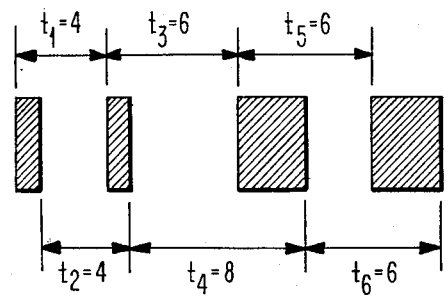
FIG. 1A is a representation of ETAB bar code.

FIG. 1A illustrates the ETAB bar code already disclosed in the above mentioned Technical Disclosure Bulletin.

Let's first define some of the terms which will be used throughout the following description:

module: represents the minimum width of any bar in the code (e.g., first dark trace in the case of FIG. 1A). It is directly related to the density of the code.

bar: is an integral number of consecutive modules of the same type (e.g., the first white space on FIG. 1A is a 3 module bar).

bit length: represents a sum of two consecutive bars that encodes a binary bit or bits; also represents an integral number of modules; a bit is measured from the leading edge of a mark (or space) to the leading edge of the next mark (or space) (e.g., $t_1=4$).

k: is the minimum bit width in the definition of the code, expressed in modules.

n: is the noise margin, or the difference between the bit lengths defined by the code, also expressed in modules.

Figure 2:
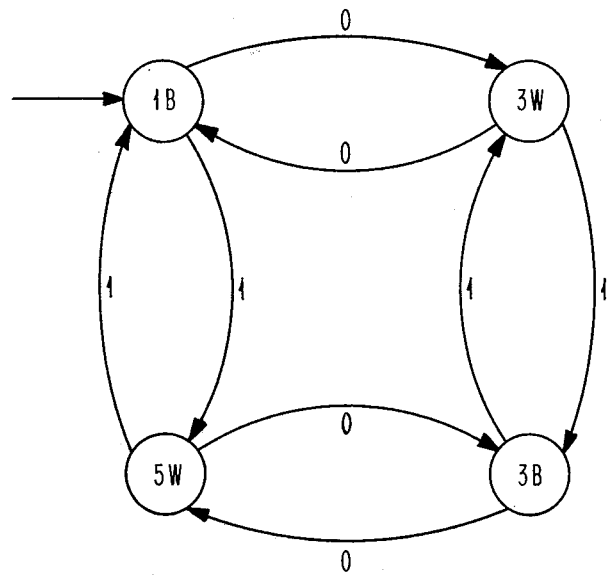
FIG. 2 is a coding diagram.

A conventional ETAB coding diagram is represented on FIG. 2, where 1B, 3W, 3B and 5W respectively stand for one black module, three white modules, three black modules and five white modules. The diagram shows that supposing the code started to be written with one black module, then the graphical encoding of a digital zero bit should be completed by three white modules. Subsequently a bit 1 would require three black modules, while a zero would require one black module, and so on. The diagram gives full information on all possible coding schemes. It shows that the code is pattern dependent, which should be taken into account while reading the graphical bar coded representation for decoding purposes.

Let's suppose one wants to represent the six bits 001011 using ETAB bar code and starting with a one black module. According to the diagram of FIG. 2, the first "0" would require three white modules to be fully encoded. The next "0" would require one black module, then "1" should be represented with five white modules, "0" with three black modules, "1" with three white modules, and the last "1" with three black modules (see FIG. 1).

Reading operation, i.e. back conversion from the graphical analog representation into the binary bit stream, will be based on relative distance measurements between leading edges of black (mark) and white (space) patterns. As represented on FIG. 1, three possible distances between consecutive similar transitions, i.e. from mark to space, and from space to mark are used, given the above definitions. They are four, six and eight modules large. Thus, for the example considered $k=4$, and $n=8-6=6-4=2$. The code used is thus designated as (4,2) ETAB. In practice noise margin is connected to the value of n selected for coding purposes. With $n=2$ modules, any one module error on one bit length (i.e. n/2) measurement due to either misplacement or misdetection of one of the marks would lead to a false bit decoded. Due to pattern dependency, this error could propagate throughout the whole coded bit stream. This may first be avoided by increasing n, but it would affect seriously the density of such a graphic code. Another way of solving the kind of problems raised here would come from the use of highly sophisticated writing and reading apparatus for precisely locating the mark edges. In addition to the higher cost of the equipment then needed, this solution would not be valid for all applications. For instance, it would not apply to situations where reading is performed using manually thus non-constantly driven scanners if we realize that in fact bit lengths are in practice detected through measurement of elapsed times between scanned mark and space edges. The invention will apply to reading at both constant and non-constant speeds and still be economically valid. On FIG. 1, the consecutive bits are designated by $t_i$, with $i=1,2,3\ldots n$. Any $t_i$ can take one of the three "levels", i.e. be equivalent to 4, 6 or 8 modules. Two of these levels represent the binary value 0. They are respectively designated by $0_L$ for short zero and $0_H$ for long zero. The third level which is intermediate between $0_H$ and $0_L$ designates a binary one. Then a $(k+n)$ modules long $t_i$ represents a binary one, while k and $(k+2n)$ modules long $t_i$ are both used to represent a binary zero.

Figure 3A:
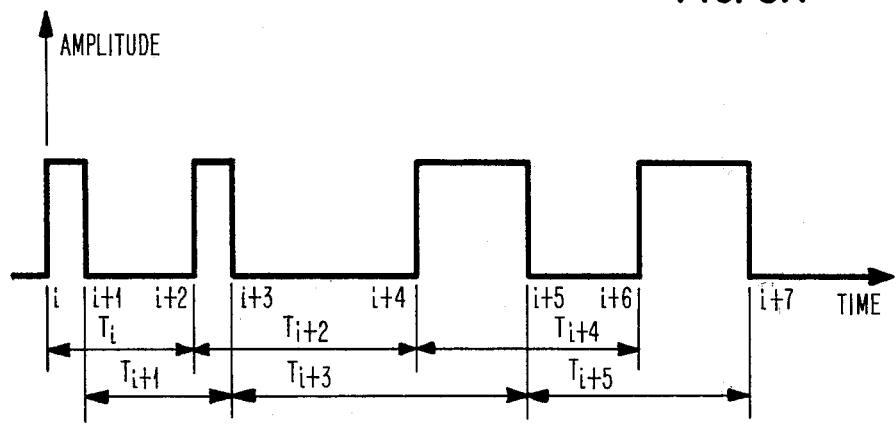
FIG. 3A is an amplitude versus time representation of the signal to be decoded.
Figure 3B:
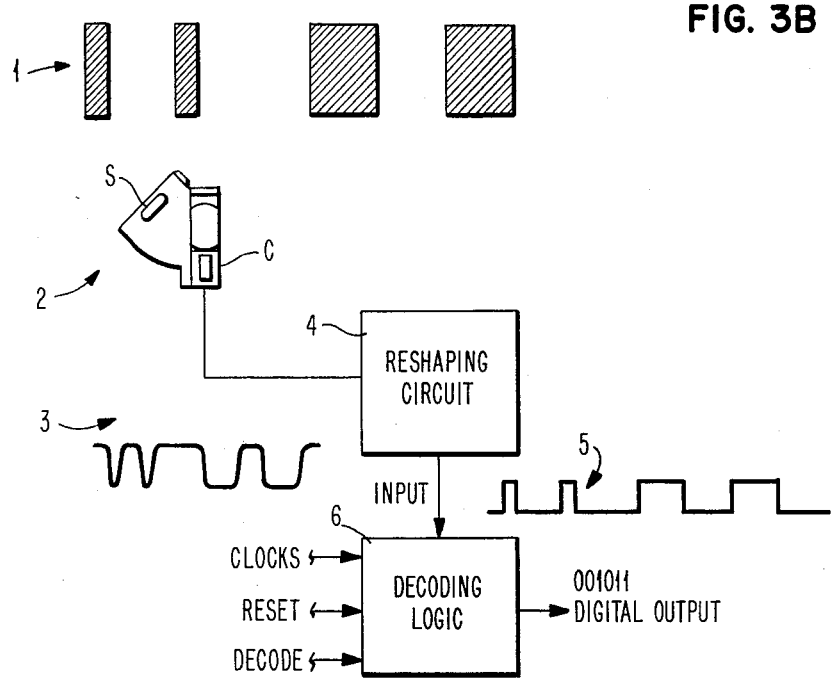
FIG. 3B is a block diagram of the bar code reading system.

A basic system for reading bar code information is illustrated on FIG. 3B. The graphic code 1 is scanned with an optical scanner 2 comprising essentially a light emitting source S and a photodetector with associated optics C. The scanner, move longitudinally along the bar code 1 provides a time varying analog output signal 3 characterizing the various transitions from mark to space, and vice versa, occurring while scanning 1. This signal is fed into a reshaping circuit 4. The output of reshaping circuit 4, i.e., the square-wave 5, is fed into the ETAB decoding logic 6 which provides the binary output corresponding to the bar code.

The reshaping circuit 4 may be a conventional circuit comprising essentially amplifying means for amplifying the analog signal 3, means for detecting both positive and negative peak levels of the amplified signal and for deriving analog levels from the peak level value detected, and means for clipping the amplified analog signal above and below said analog levels and thus provide the signal 5.

FIG. 3A illustrates such a signal which is then fed into the decoding logic 6.

The ETAB decoding logic applies the decoding process to elapsed times $T_i$, $T_{i+1}$, $T_{i+2}$, ..., representing measured values of $t_i$, $t_{i+1}$, $t_{i+2}$, .... Thus $$T_i = t_i + \xi t_i$$

$$T_{i+1} = t_{i+1} + \xi t_{i+1}$$

with $\xi t_i = \xi_i + \xi_{i+2}$ $\xi t_{i+1} = \xi_{i+1} + \xi_{i+3}$ $\xi_i$, $\xi_{i+1}$, $\xi_{i+2}$, $\xi_{i+3}$ representing errors occurring in localizing the bars leading and trailing edges. The decoded estimates of $\hat{t}_{i+1}$, i.e. $t_{i+1}$, and thus the digital binary output also are derived, from the $T_i$ measurements.

If we designate by $\hat{t}_i$ and $\hat{t}_{i+1}$ the respective decoded estimates of $\hat{t}_i$ and $\hat{t}_{i+1}$, the decoding process will be based on the following rules:

when the number of previously decoded 1 decisions is even:

$$\hat{t}_{i+1} = \begin{cases} 0_L \text{ or } k \text{ if } \dfrac{\hat{t}_i}{T_i} \cdot T_{i+1} < k + \dfrac{n}{2} \\ 1 \text{ or } k+n \text{ if } \dfrac{\hat{t}_i}{T_i} \cdot T_{i+1} \geq k + \dfrac{n}{2} \end{cases}$$

when the number of previously decoded 1 is odd:

$$\hat{t}_{i+1} = \begin{cases} 1 \text{ or } k+n \text{ if } \dfrac{\hat{t}_i}{T_i} \cdot T_{i+1} < k + \dfrac{3n}{2} \\ 0_H \text{ or } k+2n \text{ if } \dfrac{\hat{t}_i}{T_i} \cdot T_{i+1} > k + \dfrac{3n}{2} \end{cases}$$

This shows that if $t_i$ is incorrect, then it is very likely that $t_{i+1}$ will be incorrect. In other words, errors tend to propagate, which emphasizes the need for a good decoding process.

In practice, the bits will be decoded using a clock and counting the number of clock periods elapsed between the moment a transition from mark to space (or vice-versa) is scanned and the moment the next similar transition is scanned.

Now, let's consider the first part of the above set of equations, i.e.:

$$(\hat{t}_i/T_i) \cdot T_{i+1} < k + (n/2) \quad (1)$$

defining: R: resolution in modules/inch
V: scanning velocity in inches/sec
P: clock period in sec/count
the $\hat{t}_i/T_i$ represents a scaling factor to translate $T_{i+1}$ (counts) to the dimensions of $k+(n/2)$ (modules).

So $\hat{t}_i/T_i$ has the dimensions of (modules/count) which is inversely proportional to the instantaneous scanning velocity for bit $t_i$.

$$T_i \text{(counts)} = t_i \text{(modules)} \cdot \frac{1}{R\text{(modules/inch)}} \cdot \frac{1}{P\text{(sec/count)}} \cdot \frac{1}{V\text{(in/sec)}} = \frac{t_i}{R.P.V} \text{ counts}$$

Assuming as a first approximation that $\hat{t}_i = t_i$ then $$\hat{t}_i/T_i = t_i/T_i = R.P.V \quad (2)$$

Equation (1) then becomes:

$$(R.P.V.) \cdot T_{i+1} < k + (n/2) \quad (3)$$

define $M = R.P.V$, then $$M \cdot T_{i+1} < k + (n/2)$$

$$2M \cdot T_{i+1} < k + (k+n)$$

$$2T_{i+1} < (1/M) \cdot k + (1/M)(k+n) \quad (4)$$

The terms $k/M$ and $(k+n)/M$ are both expressed in counts and are therefore similar to the measured value $T_{i+1}$. They are calculated using the $t_i/T_i$ equivalent from equation (2). Note that the term $k/M$ represents the time to scan or the number of counts for a $0_L$ and $(k+n)/M$ represents the number of counts for a 1 at the instantaneous velocity during $t_i$.

If it is further assumed that the scanning velocity is varying slightly enough from one bit time to the next, then the factor R.P.V may be considered constant for consecutive bit times, because R and P are constant for a given system.

Equation (4) becomes $$2T_{i+1} < C0 + C1 \quad (5)$$

where C0 is a constant and represents the number of counts for a $0_L$ when scanning at velocity V, and C1 is a constant and represents the number of counts for a 1 under same velocity V.

The equation $(\hat{t}_i/T_i) \cdot T_{i+1} \leq k + (3n/2)$ can be manipulated similarly to produce $$2T_{i+1} \leq C1 + C2 \quad (6)$$

where C1 is the same as in equation (5) and C2 is a constant and represents the number of counts for a $0_H$ when scanning at the same velocity V as above.

The decision equations summarizing the decoding rules then become:

When the number of previously decoded 1 decisions is even:

$$t_{i+1} = \begin{cases} 0_L \text{ if } 2T_{i+1} C0 - C1 < 0 \\ 1 \text{ if } 2T_{i+1} C0 - C1 \geq 0 \end{cases}$$

When the number of previously decoded 1 decisions is odd:

$$t_{i+1} = \begin{cases} 1 \text{ if } 2T_{i+1} - C1 - C2 \leq 0 \\ 0_H \text{ if } 2T_{i+1} - C1 - C2 > 0 \end{cases}$$

These equations thus show threshold values which will be used to decode the measured bit time. The scanning velocity may vary slowly enough so that the following method can take advantage of the simplicity of the above equations. Establish three "classifiers" C0, C1 and C2, which represent time (dimension of counts) for scanning a $0_L$, 1 and $0_H$ respectively. If $t_i$ is decoded as a $0_L$, then $T_{i+1} = C0$ which will be used for decoding next bit, if $\hat{t}_i$ is decoded as a 1, $T_{i+1} = C1$ and if a $0_H$ is decoded, $T_{i+1} = C2$. The classifiers will be updated from bit to bit to dynamically adjust the process and take into account any small scanning velocity variation. In case of highly variable velocity, additional corrective factors may be used when updating the thresholds derived from the classifier contents.

Figure 1B:
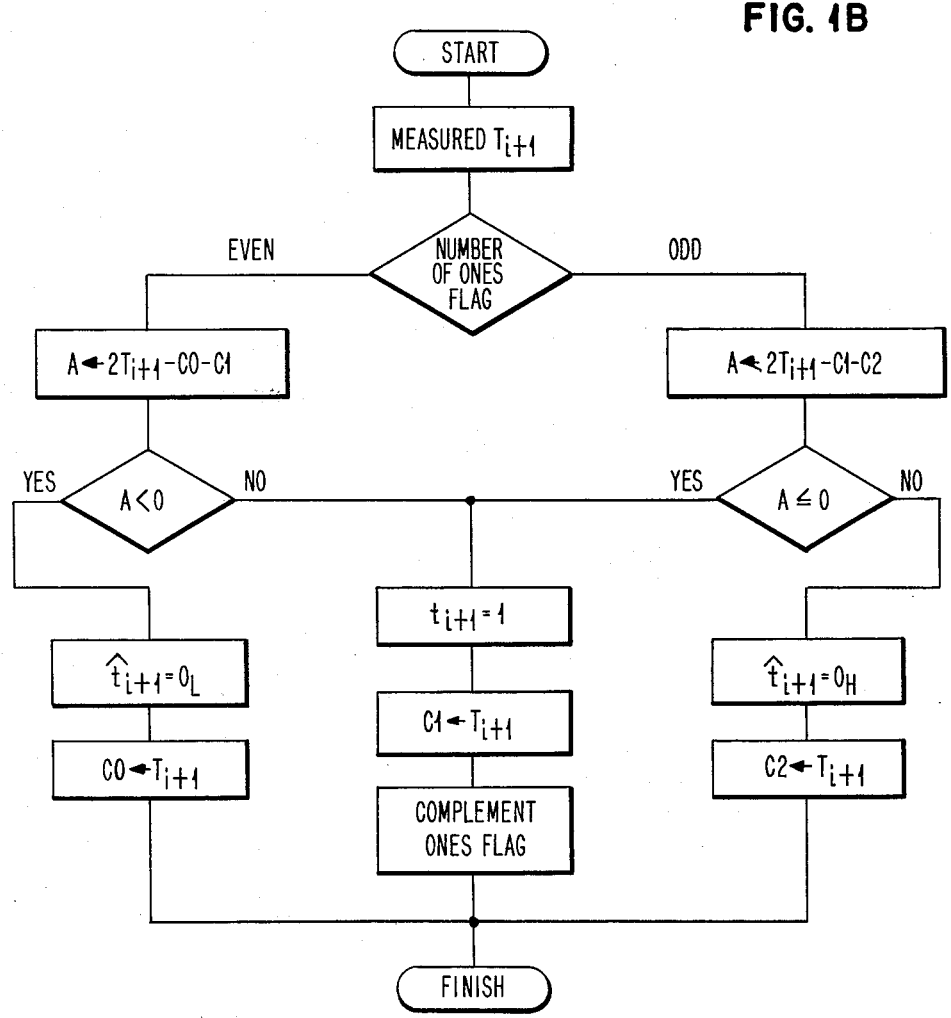
FIG. 1B is an algorithm summarizing the decoding method.

The process of the invention may thus be summarized as shown on the flow diagram of FIG. 1B. The first step involves the measurement of $T_{i+1}$ corresponding to the distance between graphic edges characterizing the $(i+1)^{th}$ bit. Then $T_{i+1}$ is either compared to a threshold $(C1+C2)/2$ or $(C0+C1)/2$ depending whether the number of bits 1 previously decoded was odd or even. Based on the result of that comparison, the value of the $(i+1)^{th}$ bit is selected to be either $0_H$ or 1 if one threshold was used, or 1 or $0_L$ if the other threshold was used, and the value of the classifiers involved in one of the thresholds is updated. In the case shown, the updating operation is simply performed by loading the value of $T_{i+1}$ just processed into one of the classifiers i.e., C0, C1 or C2. The system may be adapted to different situations by using more complex updatings.

Let's suppose that the bit stream has been decoded up to the $i^{th}$ bit and thus that $(i+1)^{th}$ bit should be decoded based on the value of measured $T_{i+1}$. Let us also suppose that the number of 1 bits decoded up to that point has been stored (more exactly what should be stored is the information relative to the odd or even condition of that number). Also two threshold values, dynamically adjusted through the use of previous bit time lengths would have been stored. Then the process for decoding the $(i+1)^{th}$ bit will involve the following steps:

select either one of said two thresholds based on said odd or even condition, compare $T_{i+1}$ to said selected threshold and select based on the result of that comparison, between $0_L$ and 1 or between 1 and $0_H$ depending upon the type of threshold used and the position of $T_{i+1}$ with respect to that threshold, update the threshold value used,
and start again the process with next bit time.

Different threshold updatings should be based on the specific reading conditions, e.g. constant or non-constant scanning speed, to take full advantage of the invention. Also, the initialization of the process should be selected based on environment conditions.

In addition, since at least part of the process involves logic decisions, the invention may be implemented using discrete logic circuits or using microprocessors as well. The choice of either solution should be based on economical conditions and manufacturing facilities available at the time of use of the invention.

Based on the above, a preferred embodiment of the ETAB decoding logic 6 (FIG. 3B) will now be described which applies best to reading situations where the scanning speed is nearly constant.

Figure 4:
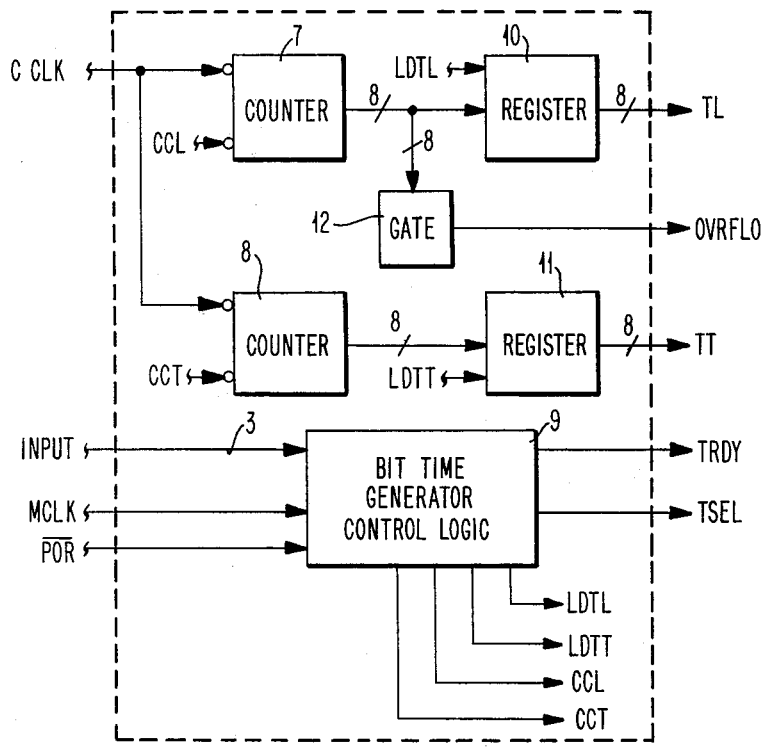
FIGS. 4 and 5 are block diagrams of the decoder according to the invention.

The ETAB decoding logic 6 has two major sections: the bit time (or length) generator (FIG. 4) which measures bit times, and the bit time decoder (FIG. 5) which decodes the bit times. The logic is driven by two clocks: MCLK and CCLK (not represented on the figures). The CCLK drives the bit time counters (7,8 in FIG. 4); its frequency depends on the size of the bit times in the bar code and on the scanning velocity. The CCLK frequency is chosen so that the bit time counter 7 does not reach full count of 255 when measuring a $0_H$ at the slowest scanning velocity, yet so that there are sufficient counts between different bit times to ensure proper decoding using integer arithmetic. For instance, if the bit times are 4, 6 or 8 times 1/240 inch and the scanning speed is 21 inches/sec, a CCLK frequency of about 140 KHz is best, to give the greatest number of counts between bit times, but not overflow counter 7. The MCLK frequency depends also on scanning velocity and on the minimum bar size of the bar code. For the present implementation, eight clock periods are sufficient to decode any bit time, and a bit time may have to be decoded in the time needed to scan a minimum bar. Assuming a scanning speed of 21 inches/sec and a minimum bar width of 1/240 inch, the minimum MCLK frequency is 41 KHz; any higher frequency is acceptable, and because MCLK determines when the input signal is sampled, a much higher frequency (100 KHz—1 MHz) is preferable.

Figure 6:
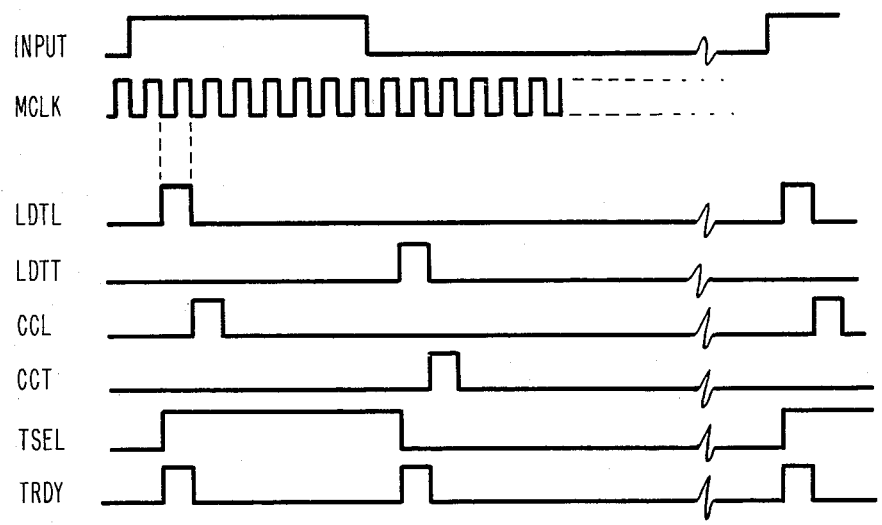
FIG. 6 is a time diagram of the bit length measuring process.

The bit time measuring means (i.e., bit time generators) operate as follows. The CCLK clocks bit time counters (7,8) continuously. When the input signal 3 goes to a high level (see FIG. 6), the bit time generator control logic (9) makes the transition from state 0 to state 1 and brings up the LDTL signal which latches the contents of the bit time counter 7 into the leading edge to leading edge bit time register (10) whose output is called TL; at the same time the signal TSEL is made active to indicate that a leading edge to leading edge bit time has beem measured, and the signal TRDY is made active to indicate that a bit time is ready for decoding. On the next transition of MCLK the control (9) enters state 2, LDTL and TRDY are made inactive and the signal CCL is made active to clear the bit time counter (7). On the next MCLK transition the control logic (9) enters state 3, and CCL is made inactive.

The control logic (9) stays in state 3 until the INPUT signal goes low and it then enters state 4, where the signal LDTT is made active to load the contents of the bit time counter (8) into the trailing edge to trailing edge register (11) whose output is called TT. The signal TSEL is made inactive to indicate a trailing edge to trailing edge bit time measured, and the signal TRDY is made active to indicate that a bit time is ready to be decoded. On the next MCLK the control (9) enters state 5 and makes CCT active to clear bit time counter (8). On the next MCLK, control (9) enters state 0 and remains until INPUT goes high again.

The eight bits of bit time counter (7) also feed into the AND gate (12) so that if the counter (7) reaches its full count of 255, the overflow signal OVRFLO is brought high. This indicates that no more bar code is to be decoded.

Figure 7:
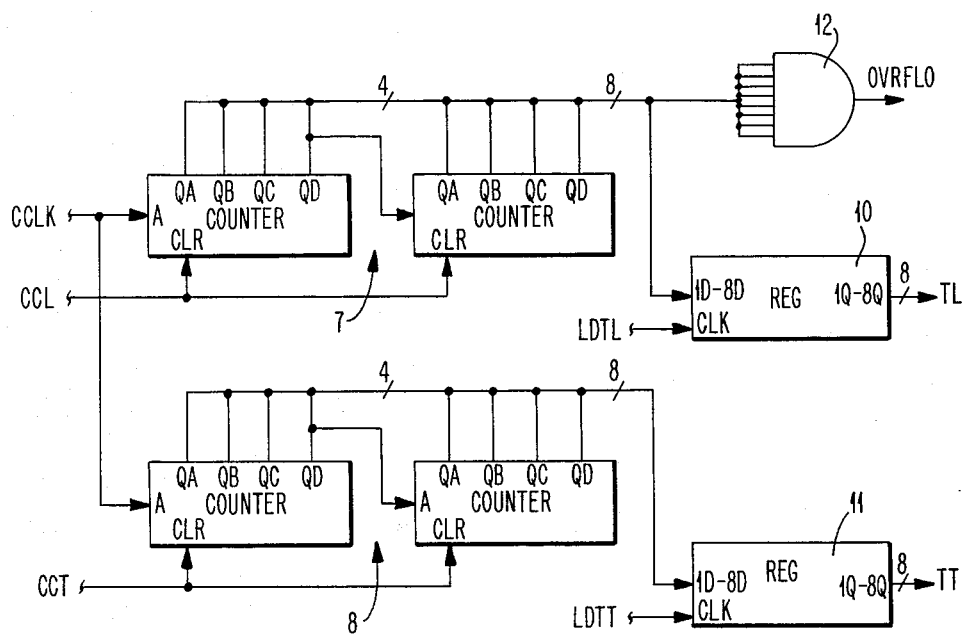
FIGS. 7 and 8 are block diagrams of a detailed implementation of the bit time generator of FIG. 4.
Figure 8:
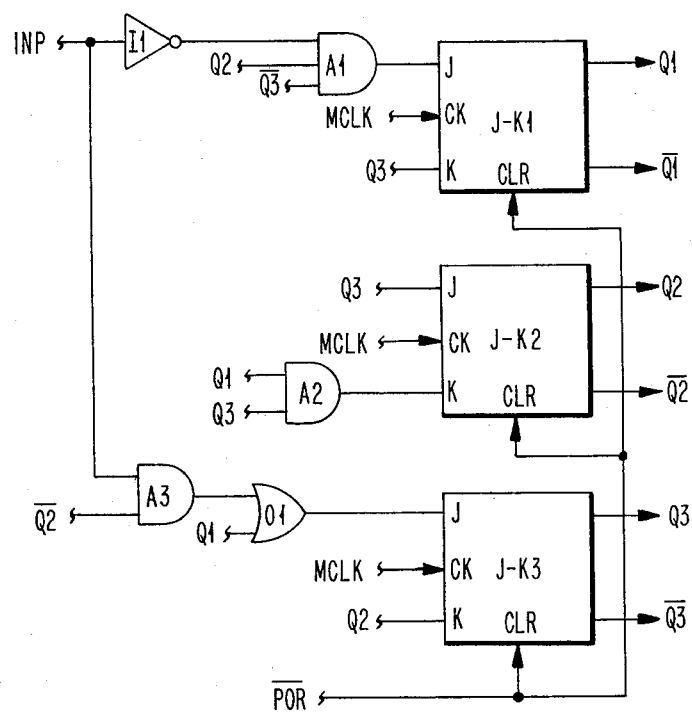
Figure 8:
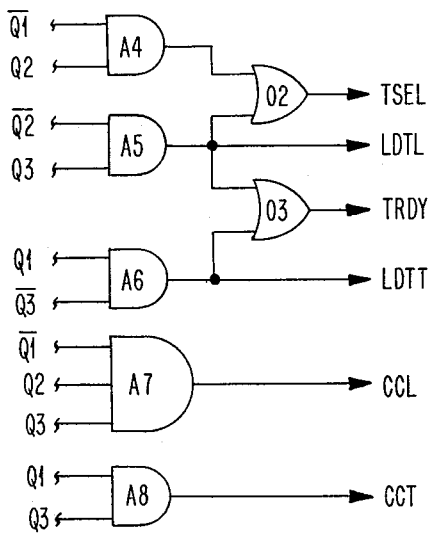

A more detailed implementation of the bit time generator is shown on FIGS. 7 and 8. FIG. 7 shows a second level design of the circuit involving counters (7) and (8), registers (10) and (11), and overflow detecting gate (12). The circuit elements may be Texas Instrument devices. Each counter (7) or (8) for instance, is made of two series mounted 74393 four bit counters. Each register (10) or (11) is made of one 74273 register; and gate (12) is made of a 7430 gate.

FIG. 8 represents an embodiment of the Bit-Time Generator Control Logic (9). It includes essentially three J-K flip-flops J-K1, J-K2 and J-K3 preferrably 74107 Texas Instruments flip-flops providing normal and inverse outputs respectively designated by Q1, Q2, Q3 and $\overline{Q1}$, $\overline{Q2}$, $\overline{Q3}$. The input signal (INPUT) to be decoded is applied to J-K1 through inverter I1 and AND gate A1, and to J-K3 through AND gate A3 and OR circuit 01. AND gate A1 is also fed with Q2 and Q3. The K inputs of J-K1 and J-K3 are respectively fed with Q3 and Q2. The K input of J-K2 is connected to AND gate A2, the inputs of which receive Q1 and Q3 while J input of J-K2 is fed with Q3. The three flip-flops are clocked by MCLK and may be cleared by an external Power On Signal POR. The logic signals provided by the flip-flops are then logically combined through AND gates A4 through A8 and OR circuits 02, 03 to provide the logic data TSEL, LDTL, TRDY, LDTT, CCL, and CCT. The connections are made according to the following equations:

Note that throughout this description a dot (·) and a (+) will be used to designate AND and OR logic functions respectively.

$$TSEL = \overline{Q1} \cdot \overline{Q2} + Q2 \cdot Q3$$

$$LDTL = \overline{Q2} \cdot Q3$$

$$TRDY = \overline{Q2} \cdot Q3 + Q1 \cdot \overline{Q3}$$

$$LDTT = Q1 \cdot \overline{Q3}$$

$$CCL = \overline{Q1} \cdot Q2 \cdot Q3$$

$$CCT = Q1 \cdot Q3$$

Figure 5:
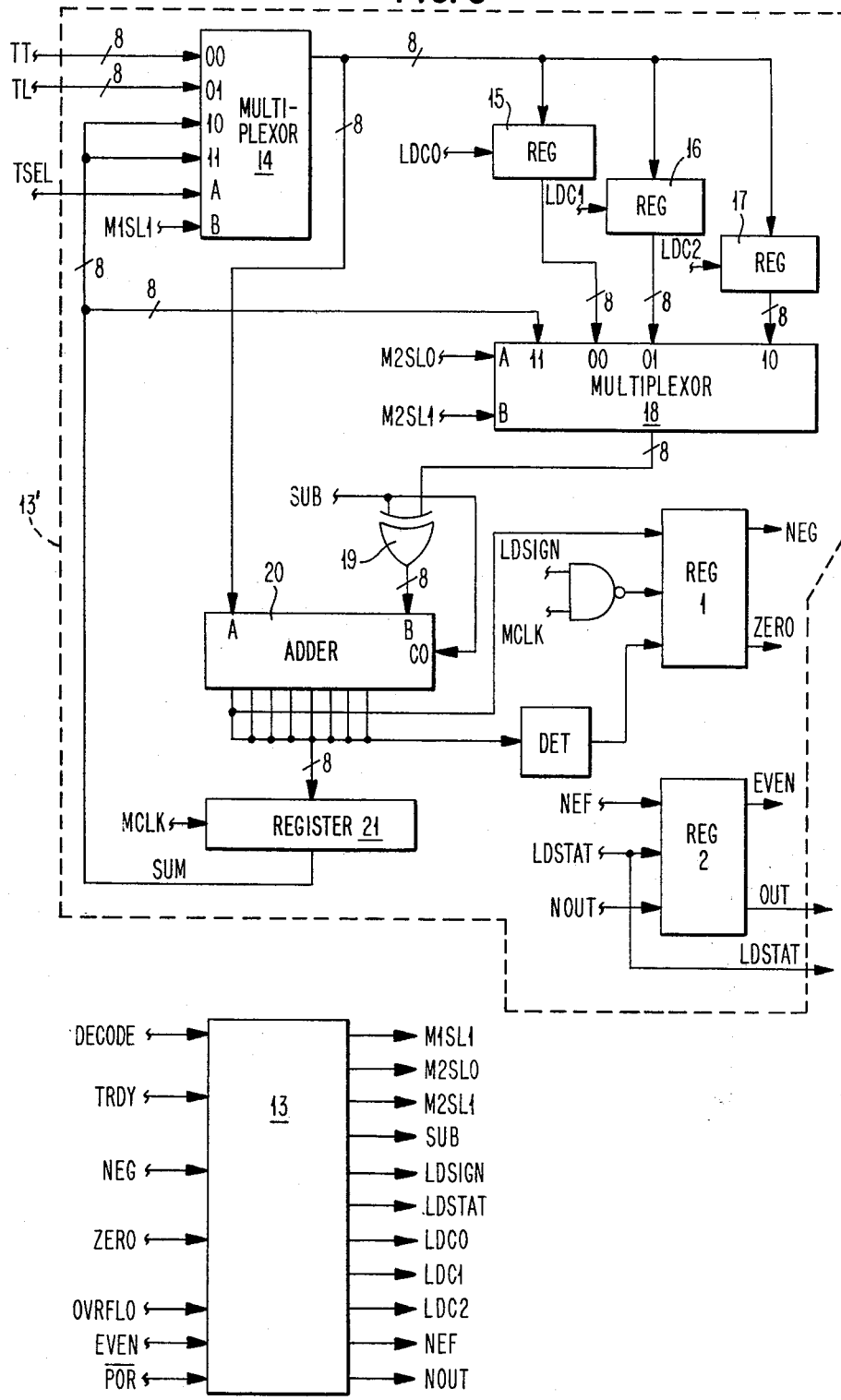

The block diagram of the decoder represented in FIG. 5, comprises mainly a decode CONTROL LOGIC (13) and a DECODE LOGIC circuit (13').

As shown on FIG. 5 for the DECODE LOGIC (13'), i.e., the decoding means, the logic signals TT, TL and TSEL provided by the bit-time generator are fed into a multiplexor (14). The output of multiplexor (14) designated by M1OUT is inputted into three eight bit registers (15), (16) and (17) respectively gated by logic signals LDC0, LDC1, LDC2, and into adder (20). The outputs of registers (15), (16) and (17), i.e., C0, C1 and C2 respectively, which are the classifiers used to generate the so called thresholds, are fed into a second multiplexor (18) gated by two signals designated by M2SL0 and M2SL1. The output of multiplexor (18) designated M2OUT is gated into adder (20) through a complementer (19) controlled by the signal SUB. The output of adder (20) is fed into a register (21) gated by signal MCLK and into a zero detector DET. The output of register (21), designated by SUM is fed back into multiplexers (14) and (18). The output of the zero detector is fed into a register REG1 together with NANDed signals LDSIGN and MCLK and with the most significant bit provided by adder (20).

Register REG1 provides information designated by NEG and ZERO. A second register REG2 is also provided which generates information EVEN and OUT, from NEF, LDSTAT and NOUT, provided by the decode control logic (13).

As will be shown later on, on an example, the DECODE LOGIC (13') circuits, controlled by the CONTROL LOGIC (13) will handle the different bit decoding functions on a time sharing basis. Therefore, the different means used for performing the decoding method involved in this invention may be visualized as follows:

Threshold means: comprise the registers (15), (16), (17) used to store the classifiers C0, C1, C2 from which the threshold values are derived. These classifiers are derived from bit time measurements and loaded into the appropriate register (15), (16) or (17) through multiplexor (14), under control of the CONTROL LOGIC (13). Two combinations of two out of the three classifiers into adder (20) through multiplexor (18) will provide the two required thresholds.

First and second comparing means will be derived from the same basic elements, mainly the multiplexors (14) and (18), the adder (20) and register (21), plus register REG2 storing the odd-even information. Differentiation between the two comparing means will come from the LOGIC 13 selecting two out of the three classifiers. It should be recalled here that in order to avoid having to perform divisions by two while computing the thresholds (C0+C1)/2 and (C1+C2,)/2 the formulaes have been arranged to enable dealing with C0+C1 and C1+C2, instead, within the comparing means.

First and second discriminating means will also share the same basic circuit elements, i.e., mainly register REG1 and zero detector DET. The differentiation between first and second will, here also, come from the control logic which keeps track of the odd-even situation.

Updating means will include the control logic selecting at least one of the registers (15), (16) and (17) based on the odd-even actual condition controlling the multiplexor 14.

Figure 9:
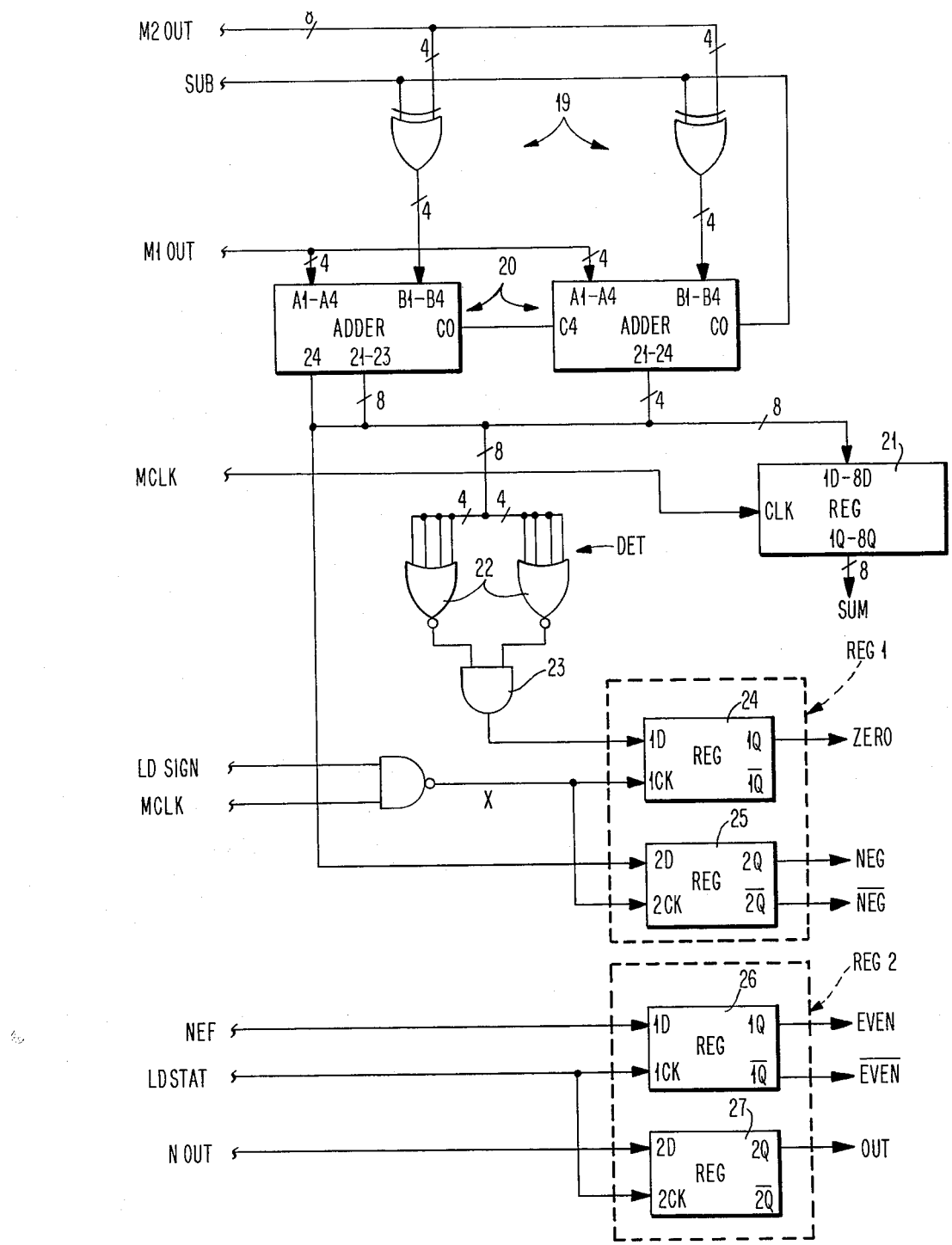
FIG. 9 is a block diagram of a detailed implementation of the bottom section of the decode logic circuitry of FIG. 5.
Figure 11:
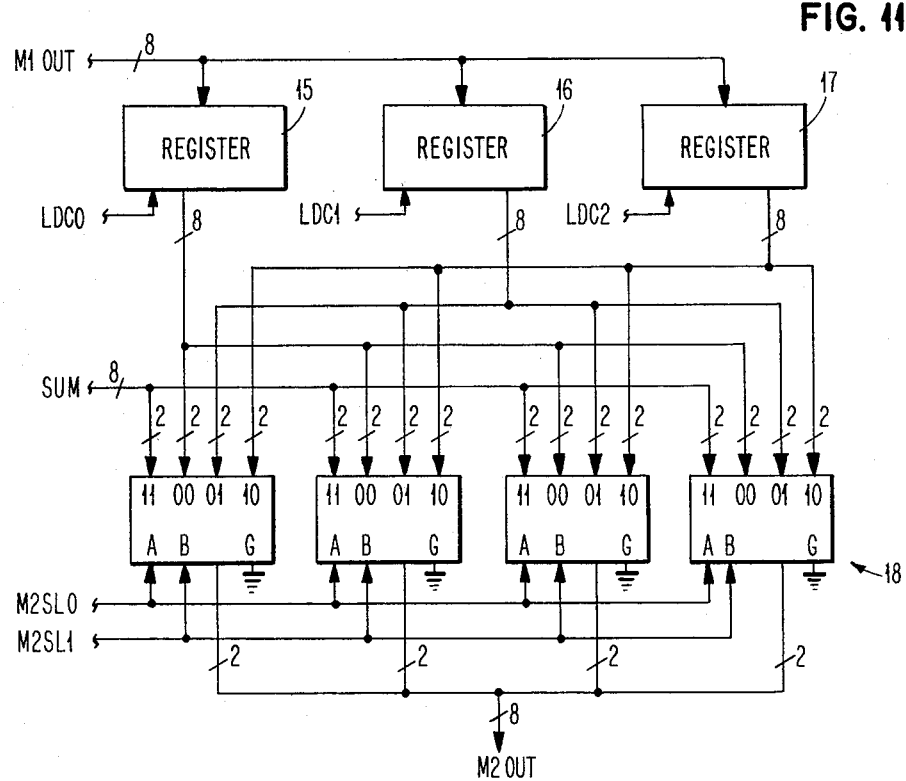
FIGS. 10 and 11 are block diagrams of a detailed implementation of the top portion of the decode logic circuitry of FIG. 5.
Figure 10:
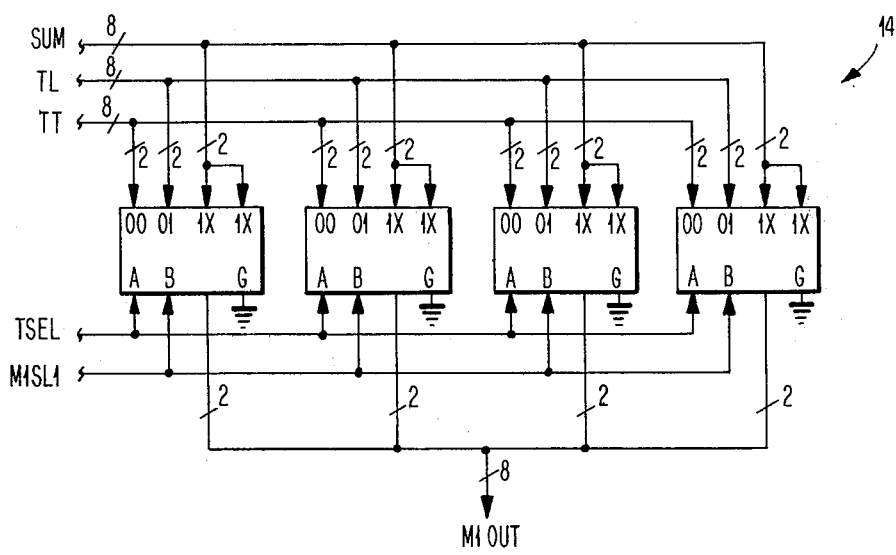

Embodiments of the different parts of DECODE LOGIC circuit (13') are represented on FIGS. 9, 10, 11 using mainly Texas Instrument circuit elements designated by their part numbers. In most cases the circuits have been split into two parts to be able to handle eight bit bytes. This is the case with gate (19), adder (20), zero detector DET and registers REG1 and REG2. The adder (20) is made of two Texas Instrument four bit adders 74283, the register (21) uses a 74273 while each register REG1 and REG2 is made of two registers 7474.

The zero detection information provided by ANDing into AND CIRCUIT (23) the outputs of two four bits NOR circuits (22) is fed into register (24) under the control of the logic information $X = \overline{LDSIGN \cdot MCLK}$.

The NEG information is provided by register (25) which stores the most significant bit, i.e., the sign bit in two's complement code of the output of adder (20) under control of same X information.

As shown in FIGS. 10 and 11, the multiplexors (14) and (18) are each made with four 74153, and registers (15), (16) and (17) are made with one register 74273 each, all from Texas Instrument.

Figure 12:
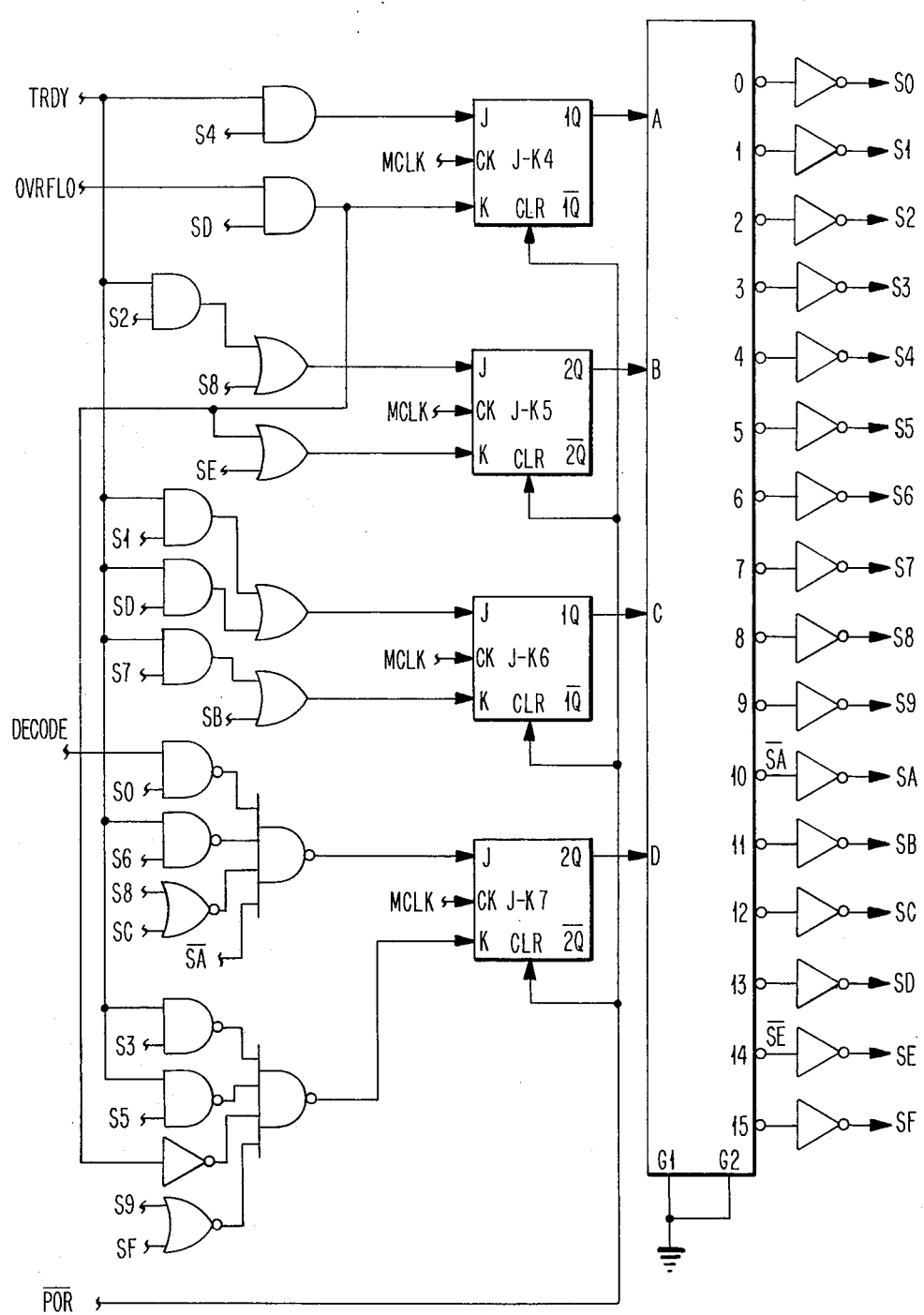
FIGS. 12 and 13 are block diagrams of a detailed implementation of the control logic 13 of FIG. 5.
Figure 13:
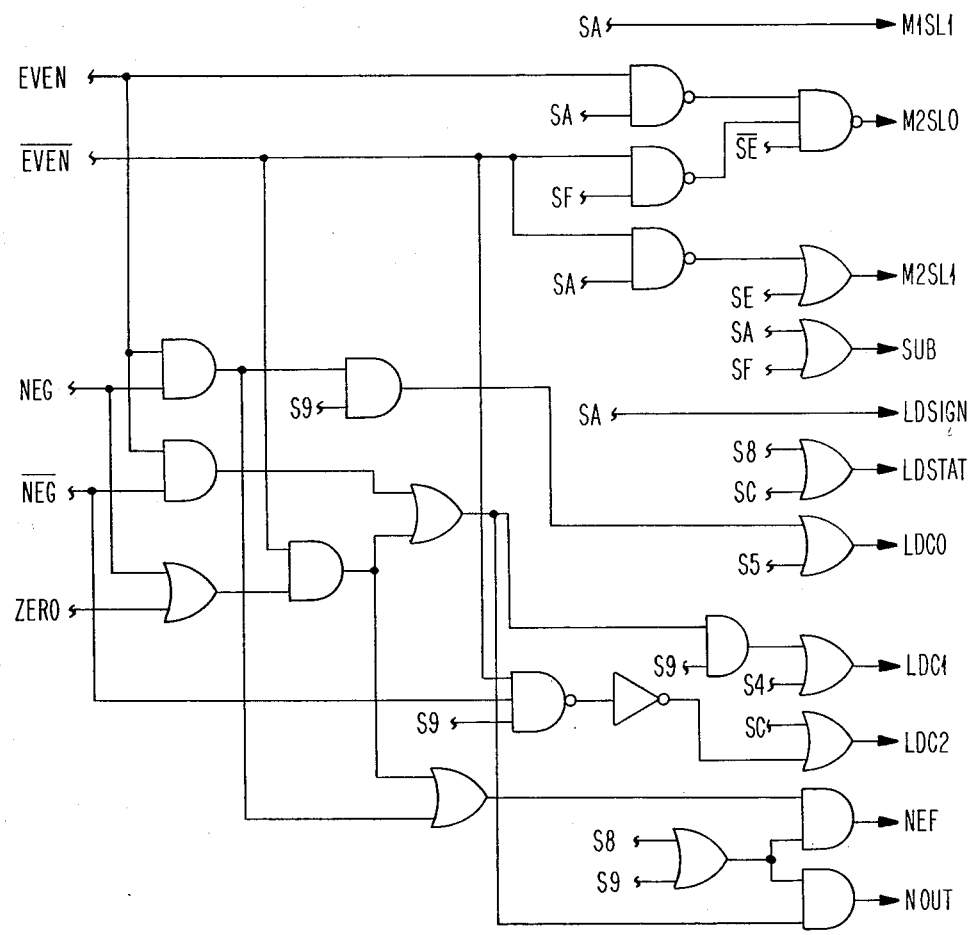

The decode CONTROL LOGIC (13) is made of two parts represented on FIGS. 12 and 13. The device represented in FIG. 12 provides control bits S0, S1, S2, S3 ..., S9, SA, SB, SC, SD, SE and SF, obtained by inverting the outputs 0 through 15 of a Texas Instrument decoder 74154, the inputs of which are provided by four J-K flip-flops 74107 designated by J-K4, J-K5, J-K6, J-K7. These flip-flops are clocked by MCLK and cleared by $\overline{POR}$. Their respective inputs are fed with logic signals based on the following equations:

$$J\text{-}K4 \begin{cases} \text{Input } J = TRDY \cdot S4 \\ \text{Input } K = OVRFLO \cdot SD \end{cases}$$

$$J\text{-}K5 \begin{cases} \text{Input } J = TRDY \cdot S2 + S8 \\ \text{Input } K = OVRFLO \cdot SD + SE \end{cases}$$

$$J\text{-}K6 \begin{cases} \text{Input } J = TRDY \cdot S1 + TRDY \cdot SD \\ \text{Input } K = TRDY \cdot S7 + SB \end{cases}$$

$$J\text{-}K7 \begin{cases} \text{Input } J = \overline{\overline{DECODE \cdot S0} \cdot \overline{TRDY \cdot S6} \cdot \overline{S8 + SC} \cdot \overline{SA}} \\ \quad = DECODE \cdot S0 + TRDY \cdot S6 + S8 + SA + SC \\ \text{Input } K = \overline{\overline{TRDY \cdot S3} \cdot \overline{TRDY \cdot S5} \cdot \overline{OVRFLO \cdot SD} \cdot \overline{S9 + SF}} \\ \quad = TRDY \cdot S3 + TRDY \cdot S5 + OVRFLO \cdot SD + S9 + SF \end{cases}$$

The circuit of FIG. 13 performs the following logic functions:

M1SL1 = SA

M2SL0 = $\overline{EVEN \cdot SA} \cdot \overline{EVEN \cdot SF}$
$\cdot \overline{SE}$ = EVEN·SA + EVEN·SF + SE M2SL1 = $\overline{EVEN} \cdot SA + SE$

SUB = SA + SF

LDSIGN = SA

LDSTAT=S8+SC

LDC0=EVEN·NEG·S9+S5

LDC1=[EVEN·$\overline{\text{NEG}}$+(NEG+ZERO)·$\overline{\text{EVEN}}$]·S9+S4

LDC2=SC+$\overline{\text{EVEN·NEG}}$·S9

NEF=(S8+S9)·[EVEN·(NEG+ZERO)+$\overline{\text{EVEN·NEG}}$]

NOUT=(S8+S9)·[EVEN·NEG+EVEN·(NEG+ZERO)]

Figure 14:
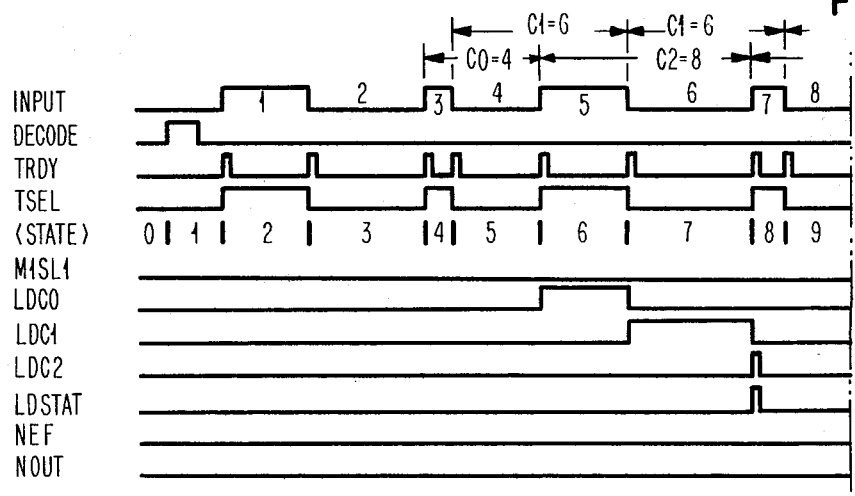

In operation, the $\overline{\text{POR}}$ signal (low logic level) intializes the bit time Decode Control Logic 13 to state zero by resetting all J-K flip-flops of FIG. 12, and an initialization is started by reading a predetermined initialization bar code sequence (see FIG. 14).

When the DECODE signal comes high, the decoder control logic 13 transfers to state 1 and starts processing the initialization sequence which will provide means for initializing the dynamic threshold levels. The first TDRY sign (from the bit time generator) signals the first edge of a line of bar code, and the control logic (13) transfers to state 2. On the second TRDY (the second bar edge), the control logic (13) transfers to state 3, on the third TRDY, to state 4, and on the fourth to state 5, and on the fifth TRDY to state 6. This means that the first black bar and the first white bar are ignored, because the signal conditioning and thresholding circuit time constants prevent these two bars from being good representations of the printed bars.

The fifth TRDY is generated from a leading edge of the INPUT, and so TSEL is active (high level), and valid bit time information is in bit time register (10). The output of this register (10) is called TL, and because TSEL is high and the control logic is holding the signal M1SL1 low, TL appears on the output of the multiplexor (14). The output of multiplexor (14) is called M1OUT and feeds the classifier registers for C0 (15), C1 (16), and C2 (17) the contents of which will be used for thresholding purposes. When the control logic enters state 6, the signal LDC0 is made active and the contents of bit time register (10) are loaded into the C0 register (15).

The sixth TRDY is generated from a trailing edge of the INPUT so TSEL is low, and valid bit time information is in the bit time register (11), whose output is called TT. Because TSEL is low and the control logic (13) is holding the signal M1SL1 low, TT appears at the output of multiplexor (14), i.e., M1OUT=TT. The control logic (13) enters state 7 on the sixth TRDY and brings LDC0 low and LDC1 high which loads the contents of bit time register (11) into C1 register (16).

On the seventh TRDY, the situation is similar to the fifth. The control logic (13) enters state 8 and brings down LDC1 and brings up LDC2, which loads the contents of bit time register into C2 register (17). In addition the signal LDSTAT is brought up which loads the status latch (26) and output latch (27). Since the signals NEF and NOUT are held low by the control logic (13), the output of status latch (26) indicates an odd number of ones ($\overline{\text{EVEN}}$ high), and the output latch (27) indicates an initial output of a zero (OUTPUT low). On the next MCLK the control logic (13) transfer to state 9 and brings down LDSTAT. Down to state 7, the information OUTPUT and EVEN may be considered in a "Don't Know" situation.

The initialization sequence has been selected such that the decoding process starts with an odd number of ones, which determines which threshold level should be used while decoding the first significant bit. Also this threshold level has been selected equal to (C1+C2) but could be selected differently based on reading conditions.

The decoding logic is now initialized with a representative bit time measurement for a $0_L$ (bar 3+bar 4) in C0 register (15), for a 1 (bar 4+bar 5) in C1 register (16), and for $0_H$(bar 5+bar 6) in C2 register (17) and with the proper (odd) state in status latch (26). Any following bar pattern of unknown information can now be properly decoded.

Figure 15B:
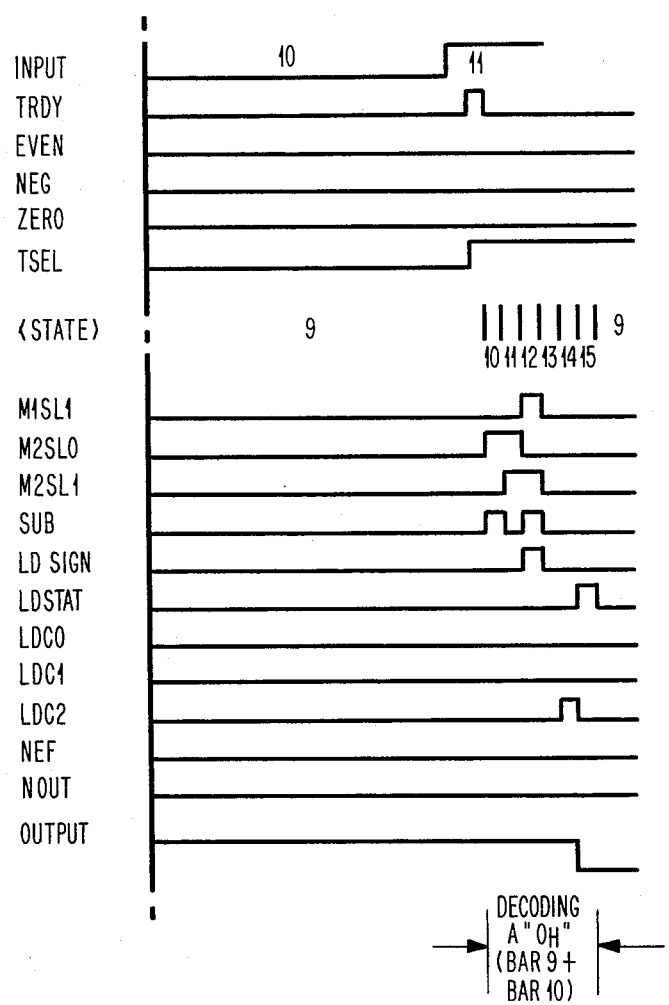

After initialization the decoder can decode any bit sequence. A typical sequence is illustrated in FIGS. 15A and 15B. The input signal shown is an expanded version of that in FIG. 14, the first TRDY indication in FIG. 15A corresponds to the eighth in FIG. 14. The operation described here can be generalized to any bit sequence. The decoder can operate on either a leading edge to leading edge bit time stored in bit time register (10) or a trailing edge to trailing edge bit time stored in bit time register (11). The selection is made via the signal TSEL which selects one of the two bit times to appear on the output of multiplexor (14) at the appropriate time. The decoding sequence in FIGS. 15A and 15B starts with a trailing edge to trailing edge measurement.

On any TRDY when the decode control logic (13) is in state 9, the control logic (13) transfers to state 10. This brings M1SL1 low to select the proper bit time (determined by TSEL) to appear on the output of multiplexor (14), it allows the signal M2SL0 to become the logical complement of the status register (26), and it brings the signal SUB high which causes the complementer (19) to complement the output of multiplexor (18). This complement appears at the B input of the 8 bit adder (20). In the case illustrated the status register (26) content is low, so M2SL0 is high and since the control logic (13) has M2SL1 low, the contents of the C1 register (16) appear at the output of multiplexor (18). Multiplexor (14) feeds the A input of the adder (20), so the bit time to be decoded appears at the A input of the adder (20) and the 2's complement of the C1 register (16) appears at the B input (because SUB feeds the carry input of the adder 20), performing a subtraction operation (T-C1), with the result appearing at the output of the adder (20). On the next MCLK transition, the result of the subtraction is latched into the SUM register (21) by the signal MCLK, and the control logic transfers to state 11. In state 11, the M1SL1 signal continues to select the bit time to appear at the A input of the adder (20), and M2SL0 and M2SL1 are brought high to select the SUM register (21) to appear at the output of multiplexor (15) and the SUB signal is brought low to allow the uncomplemented SUM register (21) contents to appear at the B input of the adder (20). The addition performed results in (2T-C1) which is latched into the SUM register (21) as the control logic transfers to state 12. In state 12, the control logic (13) brings M1SL1 high to select the contents of SUM register (21) to appear at the A input of the adder (20); M2SL0 is allowed to become the state of the status register (26) and M2SL1 to become the complement of the status register (26). Per the example given, M2SL0 becomes low and M2SL1 becomes high so the contents of C2 register (17)

appear at the output of multiplexor (18). The signal SUB is brought high, so the adder (20) performs a subtraction and the result is (2T-C1-C2). During state 12, the control logic (13) brings up the LDSIGN signal to allow loading the most significant bit of the adder output (the sign bit in 2's complement arithmetic) into the sign latch (25). Also the result is fed into the two NOR gates (22) and the output of these gates feed the AND gate 23 to detect if the result is zero. This zero indication is also loaded into the zero register (24) when the sign register (25) is loaded. If the result of (2T-c1-c2) is negative the sign latch (25) output (NEG) will be high; if the result is zero the ZERO output will be high. As the sign latch (25) is loaded on the MCLK signal the control logic (13) transfers to state 13 where the LDSIGN signal is brought down; this allows sign latch (25) output to settle for use in state 14. In state 13, the M1SL1 signal is brought low so that the bit time appears on the output of multiplexor (14) and at the input of all the classifier registers C0, C1, and C2 (15, 16, 17) to update the threshold levels. On the next MCLK transition, the control logic (13) transfers to state 14 where the following signals are allowed to take on the values determined by the following logic equations (Eq):

$$LDC0 = EVEN \cdot NEG \cdot S9 + S5$$

$$LDC1 = [\overline{EVEN \cdot NEG} + EVEN \cdot (NEG + ZERO)] \cdot S9 + S4$$

$$LDC2 = \overline{EVEN} \cdot \overline{NEG} \cdot S9 + SC$$

$$NEF = [EVEN \cdot NEG + \overline{EVEN} \cdot (NEG + ZERO)] \cdot (S8 + S9)$$

$$NOUT = [\overline{EVEN \cdot NEG} + EVEN \cdot (NEG + ZERO)] \cdot (S8 + S9)$$

In the case illustrated by FIG. 15, the first TRDY (see FIG. 15A) occurs after a 1 bit time and with the status register (26) indicating odd ($\overline{EVEN}$ high); the result (2T-C1-C2) should be negative, so NEG would be high and LDC1 would go high to load the bit time into the C1 register (16); also NEF and NOUT go high. On the next MCLK, the control logic transfers to state 15 where any classifier register load signal is brought low and LDSTAT is brought high to load the new even or odd state into the status register (26) (in this case EVEN goes high) and the new output into the output register (27). On the next MCLK, the control logic (13) transfers back to state 9 to wait for the next TRDY.

The control logic follows the same state transition path for any bit time. The only changes in register loading or arithmetic operations result from the difference in the status register (26) and differences in the result of arithmetic operations.

The second TRDY in FIG. 15a signals that a $0_L$ bit time is ready to be decoded. On this TRDY, the control logic (13) enters state 10 and brings up SUB, and allows M2SL0 = $\overline{EVEN}$; therefore the bit time appears at the A input of the adder (20) and the 2's complement of C0 register (15) appears at the B input of the adder (20), and the result (T-C0) is latched into the SUM register (21). On entering state 11, the control logic (13) brings M2SL0 and M2SL1 high and SUB low. Thus the bit time again appears at the A input of the adder (20) and the SUM register (21) contents appear at the B input. The result (2T-C0) is latched into the SUM register (21). On entering state 12 the control logic (13) brings M1SL1 high so that the SUM register (21) contents appear at the A input of the adder (20) and allows M2SL0 = EVEN and M2SL1 = $\overline{EVEN}$, which for this case allows the C1 register (16) contents to appear on the output of multiplexor (18). The control logic (13) also brings SUB high so that the adder (20) performs a subtraction, and brings LDSIGN high so that the most significant bit of the result (2T-C0-C1) and the zero indication are latched into the zero (24) and sign (25) registers. In state 13 the bit time is selected to appear at the input of the classifier registers. On entering state 14 the control logic allows the signals to become the values in equations (Eq). In this case EVEN is high and the result (2T-C0-C1) should be negative so NEG is high and the signal LDC0 loads the bit time in the C0 register (15). The signal NEF goes high and NOUT goes low. On entering state 15, the control logic brings LDSTAT high to load the status latch (26) and the output latch (27). The control logic then transfers back to state 9 to wait for the next TRDY.

The third TRDY in FIG. 15A signals that a 1 bit time is ready to be decoded. On this TRDY, the control logic (13) enters state 10 and brings up SUB and allows M2SL0 = EVEN. In this case, EVEN is high, so the output of the adder (20) is (T-C0). On entering state 11, M2SL0 and M2SL1 are brought high, so the output of the adder (20) is (2T-C0). On entering state 12, M1SL1, SUB and LDSIGN are brought high, and M2SL0 = EVEN and M2SL1 = $\overline{EVEN}$. In this case the output of the adder is (2T-C0-C1) and the sign of the result is latched into the sign register (25). The control logic (13) transfers to state 13 and the bit time appears at the input of the classifier registers (15, 16, 17); then the control logic transfers to state 14 where the logic signals become the values in equations (Eq). In this case EVEN is high, and NEG should be low, so the signal LDC1 loads the bit time into the C1 register (16). The signal NEF remains low and NOUT goes high. The control logic transfers to state 15 and brings LDSTAT high to load the status (26) and output (27) registers; then the control logic returns to state 9.

The fourth TRDY in FIG. 15B signals that a $0_H$ bit time is ready to be decoded. The control logic (13) enters state 10. In this case, the output of the adder (20) is (T-C1). In state 11, the output of the adder (20) becomes (2T-C1). On entering state 12, for this case, the adder output becomes (2T-C1-C2) and the sign and zero indicators are latched.

The control logic transfers to state 13 and the bit time appears on the classifier registers (15, 16, 17) inputs. In state 14, equation (Eq) becomes valid. In this case EVEN is low, and the result should be positive, so $\overline{NEG}$ is high, and LDC2 loads the bit time into the C2 register (17); the signals NEF and NOUT are low. In state 15, the LDSTAT signal loads the status register (26) and the output register (27). The control logic then returns to state 9.

When in state 9, if the bit time counter (7) ever reaches its full count, the OVRFLO signal causes a transfer to state 1. The decoder is now ready for a new line of bar code.

Figure 16:
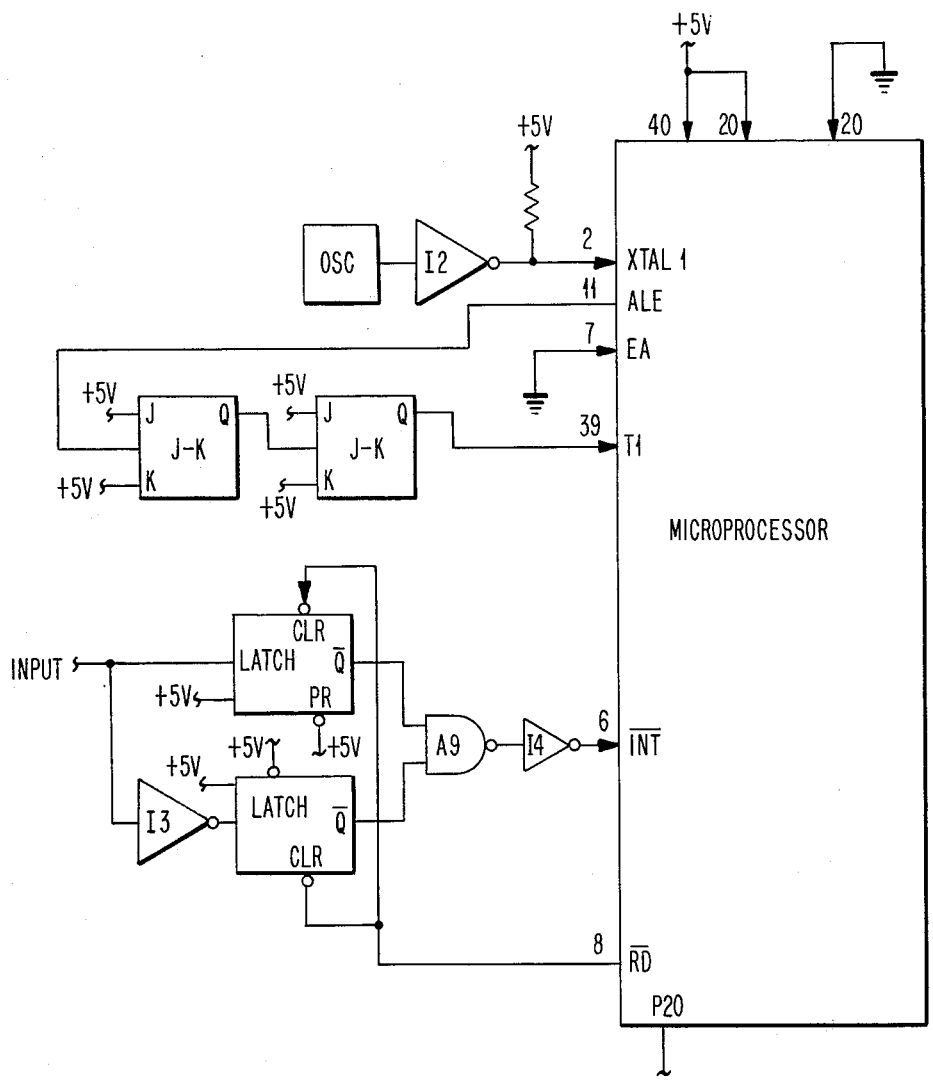
FIG. 16 is a block diagram of a second embodiment of the decoder performing the process of the invention.

The process and more particularly those steps performed by the bit time decoding means involve the performance of logic functions as well as data handling operations. In a technological environment where microprocessors become competitive as far as cost and performances are concerned, it might be advisable to implement the process of present invention using a microprocessor based type of architecture such as the one disclosed hereunder (see FIG. 16). The microprocessor used is an Intel 8748. Such microprocessor is described in the Intel MCS-48 Microcomputer User's Manual to which we will refer here. More particularly, we will refer to those pages 2-2 and 2-3 of said manual and use the same terminology.

Figure 17:
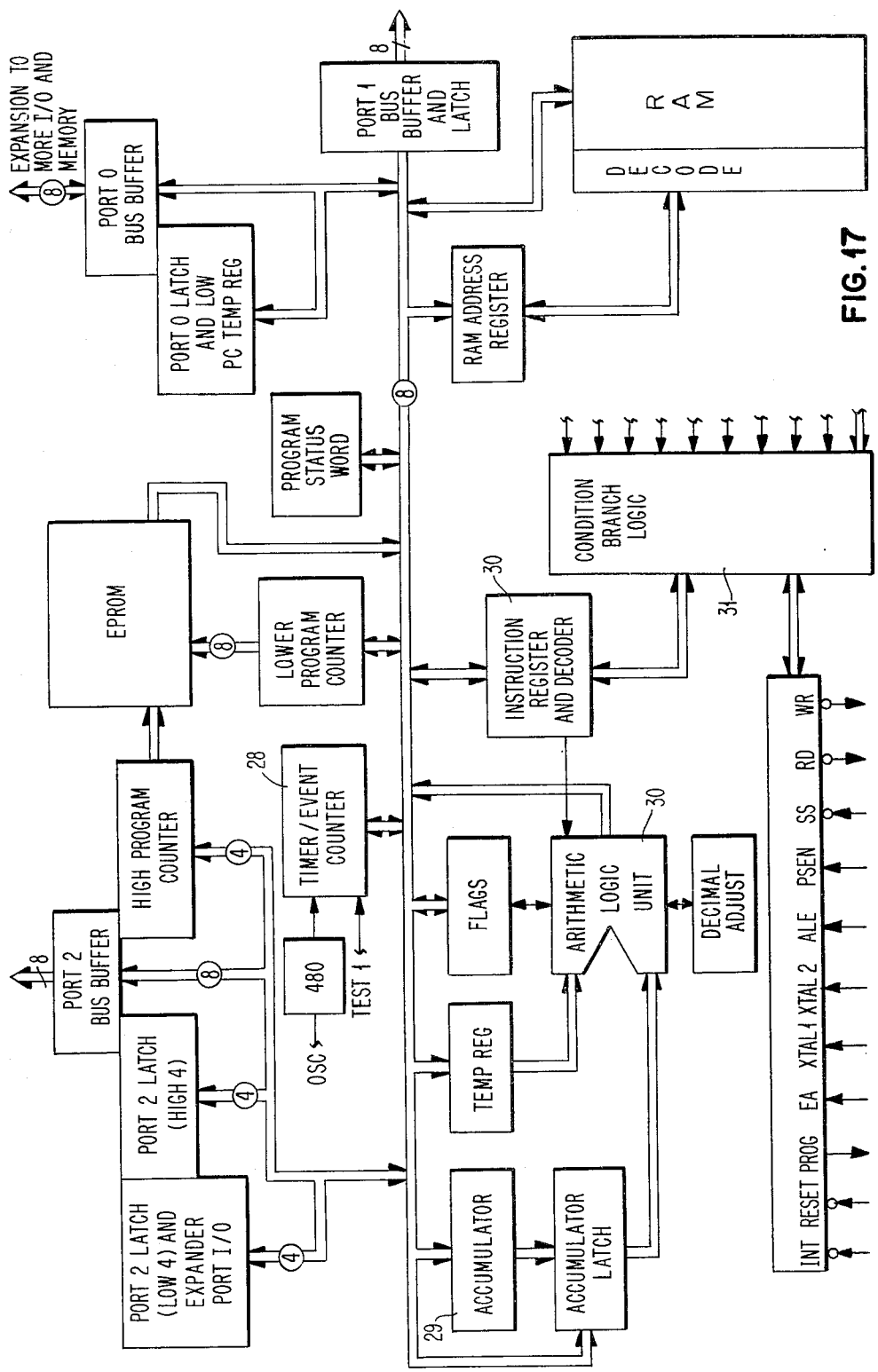
FIG. 17 is a block diagram of the microprocessor of FIG. 16.

A 6 MHz oscillator (OSC) is connected to the microprocessor input XTAL1 through an inverter 12. Input ALE is connected to T1 through two series connected J-K 74107 flip-flops. The reshaped INPUT signal is applied to the INT of the microprocessor through two inverters I3, I4, one NAND circuit A9 and two Texas Instrument latches 7474. The output of I4 is fed into the 8748 through $\overline{INT}$, while $\overline{RD}$ is connected to the two 7474s. The microprocessor block diagram represented on FIG. 17 should be considered in conjunction with the above mentioned Users' Manual (see page 2—2 and related description incorporated herein by reference).

In this implementation the timer/event counter 28 is used to measure individual bars, rather than bit times. The event counter 28 can be driven with any optional frequency that meets the 8748 specification, and in this implementation, the ALE signal is divided by 4 by the ÷4 circuit consisting of the 74107 J-K flip-flops. The output of the ÷4 circuit is fed into the Test 1 input to drive the event counter 28. The INPUT signal sets one of the two 7474 latches on every transition (edge); this action causes the 8748 interrupt line $\overline{INT}$ to go low, interrupting whatever action the 8748 is doing and giving control to the INTSR subroutine (see attachments). The INTSR subroutine resets the interrupting signal and then reads the event counter 28, which corresponds to the width of a bar, into the accumulator 29. The contents of the accumulator are exchanged with the contents of register bank 0 register 3 (R03) (see Users' Manual page 2-3) which holds the width of the previous bar. The contents of accumulator 29 and R03 are added using the ALU (30), and the result (a bit time), is stored in register bank 1 register 7 (R17). The event counter is reset to 0, and flag 1 is set to indicate a bit time is ready to be decoded. Since the bit time measurement is an interrupt driven process, it can occur simultaneously with bit time decoding.

Figure 18:
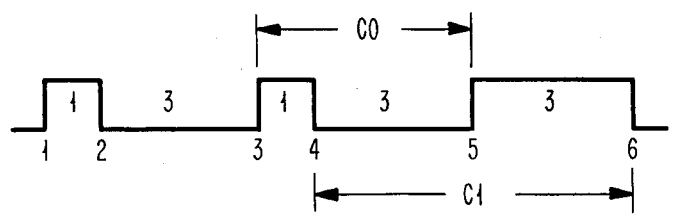
FIG. 18 is a bit pattern representation to be considered in connection with FIGS. 16 and 17.

The initial bit pattern used in connection with this implementation has been selected as shown on FIG. 18.

The routine PRCSSM (see attachment) performs the initialization of the classifiers. PRCSSM monitors flag 1 and when it indicates a bit time is ready to be decoded, it moves the bit time from R17 to R16. As in the first implementation mentioned in this application, the first two bars are ignored; on the fifth edge, the bit time stored in R16 is moved to the accumulator 29 and register bank 1 register 1 (R11) as the classifier (C0). On the sixth edge the bit time stored in R17 is moved to the accumulator 29 and stored in register bank 1 register 2, (R12) as the 1 classifier (C1). The C0 (R11) is loaded into the accumulator and the 2's complement is formed using the ALU (30). The C1 (R12) is added to the accumulator (29) using the ALU 30 to get C1-C0 which yields a value representative of 2 scans (the noise margin, n). The C1 (R12) added again to get a value representing the classifier for a $0_H$ and the result is stored in register bank 1 register 3 (R13). The flag indicating an odd number of 1's (ODD flag) is set and stored in register bank 1 register 4 (R14). The decoder is now initialized and the routine BITIDM can be used to decode bit times.

Bit decoding is performed by the routine BITIDM. It first loads the ODD flag from R14 into the accumulator and branches using the conditional branch logic 31 to check for a 1 or $0_H$ if the flag is set (indicating an odd number of 1's).

If the ODD flag is not set C0 (R11) is loaded into the accumulator and the ALU is used to form the 2's complement (—C0). The bit time (R16) to be decoded is added via the ALU and added again to form the result (2T-C0). This result is stored temporarily in register bank 1 register 0 (R10). The C1 (R12) is loaded into the accumulator and the ALU is used to form the 2's complement (—C1). The contents of R10 (2T-C0) are added using the ALU to form (2T-C0-C1). If the result is positive or zero, the carry flag will be set and the conditional branch logic 31 causes a branch to perform the necessary actions for a 1 decoded. If a $0_L$ is decoded, the bit time (R16) is loaded into the accumulator and then stored as the new C0 (R11). The carry flag is cleared to indicate a zero has been decoded and BITIDM is left. If a 1 is decoded, the ODD flag (R14) is loaded into the accumulator and complemented using the ALU (30), and stored in R14. The bit time (R16) is loaded into the accumulator and stored as the new C1 (R12). The carry flag is set to indicate a one has been decoded and BITIDM is left.

If the ODD flag is set, a very similar instruction sequence is executed to form the result (2T-C1-C2). If this result is less than or equal to zero, the condition branch logic 31 causes a branch to the instruction sequence for a 1 as described above. If the result is greater than zero, a $0_H$ has been decoded and the bit time (R16) is loaded into the accumulator and stored as the new C2 (R13). The carry flag is cleared to indicate a zero was decoded, and BITIDM is left.

In addition to bit decoding operations, the microprocessor facilities are further used here to perform byte generation, through use of a routine designated by BUILD.

Also, overflow operations used as mentioned previously, for instance, to monitor the system at the end of reading or in case of bad reading, will be controlled using a TOVFR routine, which also performs checking operations such as byte checking.

Few additional comments may help to better understand the system. The ETAB reading operation may proceed in both directions. A flag $(F_0)$ is used to define the present direction. Also, the microprocessor operates on an interrupt basis and a flag $(F_1)$ is used for that purpose. The the interrupt operation is handled by an interrupt service routine (INSTR).

All these routines together with routines VECTR and MAINR used to define functions within the system for performing both bit decoding and byte assembling, as well as definition of registers allocations, I/O, statuses and flags, etc., completely defining the system have been attached to this specification.

Even though the invention has been disclosed with a specific threshold updating principle, it should be recalled that while still using the thresholding principle of the invention, one may slightly change the threshold updating algorithm to enhance the results whenever different reading conditions occur such as under highly varying scanning velocities or when dealing with fully off-line processing.

ATTACHMENTS

OUTPUTS:
- PORT1 -- STATUS WORD
- BUS -- BYTE DATA
- PORT2 -- NOT USED

INPUTS:
- INT* -- GOES TO LOGICAL 0 ON TRANSITION IN CODE
- RESET* -- GOES TO LOGICAL 1 FOR SYSTEM ACTIVE STATE
  GOES TO LOGICAL 0 FOR SYSTEM HOLD STATE

STATUS WORDS:
- START READ -- 10000001
- NO END OF CODE -- NOT USED
- BAD START -- 11000010
- PARTIAL BYTE -- 11000100
- BAD END -- 11000001
- LINE GOOD -- 10000100
- DATA READ -- 10000010

*** DATA ***

STATE FLAG:
- BIT7 -- NOT USED
- BIT6 -- NOT USED
- BIT5 -- NOT USED
- BIT4 -- DATA FLAG (=1 IF DECODING DATA)
- BIT3 -- CODE FLAG (=1 IF BITS ARE START CODE)
- BIT2 -- ACTION FLAG (=1 IF START CODE ACTION NEEDED)
- BIT1 -- CALIB FLAG (=0 IF CALIBRATING INITIAL THRESHOLDS)
- BIT0 -- STEP FLAG (=1 IF CALIBRATING INITIAL THRESHOLDS)

FLAGS:
- F1 -- DIRECTION FLAG (=1 IF REVERSE READ)
- F0 -- WORK FLAG (=1 IF BUFFER HAS DATA)

DEDICATION OF REGISTERS:
- BANK0: R7 -- BYTE
  - R6 -- BIT CNT
  - R5 -- ACC HOLD
  - R3 -- DELTA
- BANK1: R7 -- TIME (BUFFERS)
  - R6 -- TIME (PROCESSED)
  - R5 -- TEMP STORAGE
  - R4 -- STATE FLAG
  - R3 -- THI (HIGH THRESHOLD)
  - R2 -- TLOW (LOW THRESHOLD)
  - R1 -- SCAN1 (1 SCAN TIME)
  - R0 -- COMPLIMENT OF TIME, SZERO

*********** VECTR ***********

ORIGIN: 0

| INST LOCN | OP CD | OP ND | STMT NO | LABEL | MNEMONIC | *OPERAND | COMMENT |
|---|---|---|---|---|---|---|---|
| | | | 1 | VECTR | ORG | H00 | |
| 0000 | 04 | 09 | 2 | | JMP | MAINR | VECTOR TO MAIN ROUTINE |
| 0002 | 00 | | 3 | | NOP | | |
| 0003 | 04 | 70 | 4 | | JMP | INSTR | VECTOR TO INTERRUPT SERVICE ROUTINE |
| 0005 | 00 | | 5 | | NOP | | |
| 0006 | 00 | | 6 | | NOP | | |
| 0007 | 04 | 85 | 7 | | JMP | TOVFR | VECTOR TO TIMER OVERFLOW ROUTINE |
| | | | | | END | | |

*********** MAINR ***********

ORIGIN: 9

| INST LOCN | OP CD | OP ND | STMT NO | LABEL | MNEMONIC | *OPERAND | COMMENT |
|---|---|---|---|---|---|---|---|
| | | | 1 | MAINR | ORG | 9 | |
| | | | 2 | ************************************************************ | | | |
| | | | 3 | ***** | | MAIN ROUTINE | ***** |
| | | | 4 | ************************************************************ | | | |
| | | | 5 | * | | | |
| 0009 | 23 | 81 | 6 | | MOV A, | H81 | OUT PUT 'START READ' |
| 000B | 39 | | 7 | | OUTL P1,A | | * STATUS WORD |
| 000C | BF | 01 | 8 | | MOV R7, | H01 | BYTE ← 00000001 |
| 000E | BE | 08 | 9 | | MOV R6, | H08 | BIT CNT ← 8 |
| 0010 | D5 | | 10 | | SEL RB1 | | INITIALIZE STATE FLAGS |
| 0011 | 27 | | 11 | | CLR A | | STATUS FLAGS ← 0 |
| 0012 | AC | | 12 | | MOV R4,A | | CLEAR STATE FLAGS |
| 0013 | 44 | 00 | 13 | | JMP | PRCSSR | PROCESS CODE (MF4 USES PRCSSM) |
| | | | | | END | | |

*********** PRCSSM ***********

ORIGIN: 512

| INST LOCN | OP CD | OP ND | STMT NO | LABEL | MNEMONIC | *OPERAND | COMMENT |
|---|---|---|---|---|---|---|---|

ATTACHMENTS

```
                    1        PRCSSM   ORG        H200
                    2    ********************************************************************
                    3    *****                                                             *****
                    4    *****                PROCESS ROUTINE                              *****
                    5    *****               MINIMUM DISTANCE METHOD                       *****
                    6    ********************************************************************
                    7    *
 0200  08          7             INS A,BUS               DUMMY READ; RD STROBE RESETS INT
 0201  05          8             EN I                    ENABLE INTERRUPT
 0202  25          9             EN TCNTI                ENABLE TIMER/COUNTER INTERRUPT
 0203  76  07     10    WAIT     JF1        WORK         JUMP IF BUFFER FULL
 0205  44  03     11             JMP        WAIT         ELSE LOOP
                  12    *
                  13    * DECODE INFORMATION FROM TIME VALUES
 0207  A5         14    WORK     CLR F1                  WORK FLAG ← 0
 0208  FF         15             MOV A,R7                ACC ← TIME(BUF)
 0209  AE         16             MOV R6,A                TIME(PROC) ← TIME(BUF)
 020A  FC         17             MOV A,R4                ACC ← STATE FLAGS
 020B  92  14     18             JB4        DATA         JUMP IF DECODING DATA
 020D  72  1B     19             JB3        CODE         JUMP IF DECODING START CODE
 020F  52  34     20             JB2        ACTION       JUMP IF CALIBRATION ACTION NEEDED
 0211  1C         21             INC R4                  ELSE INCREMENT STATE FLAG
 0212  44  03     22             JMP        WAIT         JUMP TO CHECK BUFFER
                  23    *
                  24    * DATA IS BEING DECODED
 0214  34  18     25    DATA     CALL       BITID        DETERMINE BIT VALUE
 0216  74  50     26             CALL       BUILD        BUILD BYTE FOR OUTPUT
 0218  D5         27             SEL RB1                 SW REG BANK AFTER BUILD
 0219  44  03     28             JMP        WAIT         JUMP TO CHECK BUFFER
                  29    *
                  30    * DECODE START CODE
 021B  12  27     31    CODE     JB0        BIT8         JUMP IF LAST BIT IN BYTE
 021D  34  18     32             CALL       BITID        ELSE DETERMINE BIT VALUE
 021F  C5         33             SEL RB0
 0220  FF         34             MOV A,R7
 0221  F7         35             RLC A                   PUT BIT VALUE INTO BYTE
 0222  AF         36             MOV R7,A
 0223  D5         37             SEL RB1
 0224  1C         38             INC R4                  INCREMENT START COUNT IN STATE FLAG
 0225  44         39             JMP        WAIT         JUMP TO CHECK BUFFER
                  40    * BIT IS LAST IN START BYTE
 0227  34  18     41    BIT8     CALL       BITID        DETERMINE BIT VALUE
 0229  C5         42             SEL RB0
                  43    * ASSUME 'START READ' STATUS ON P1
 022A  FF         44             MOV A,R7
 022B  F7         45             RLC A                   PUT BITVALUE INTO BYTE
 022C  02         46             OUTL BUS,A              OUTPUT START BYTE
 022D  D5         47             SEL RB1
 022E  FC         48             MOV A,R4                ACC ← STATE FLAGS
 022F  43  10     49             ORL A;     H10          DATA FLAG ← 1
 0231  AC         50             MOV R4,A
 0232  44  03     51             JMP        WAIT         JUMP TO CHECK BUFFER
                  52    *
                  53    * SERVICE START CALIBRATION SEQUENCE
 0234  32  4C     54    ACTION   JB1        DIRECT       JUMP IF DECODING DIRECTION OR PARITY
 0236  12  3D     55             JB0        ONE          JUMP IF TIME VALUE IS FOR A '1'
                  56    * ELSE TIME VALUE IS FOR A SHORT ZERO (4 SCANS)
 0238  FE         57             MOV A,R6                ACC ← TIME (4 SCANS)
 0239  A9         58             MOV R1,A                TLO ← 4 SCANS
 023A  1C         59             INC R4                  INCREMENT START COUNT IN STATE FLAG
 023B  44  03     60             JMP        WAIT         JUMP TO CHECK BUFFER
                  61    * TIME VALUE IS FOR ONE (6 SCANS)
 023D  1C         62    ONE      INC R4                  INCREMENT START COUNT IN STATE FLAG
 023E  FC         63             MOV A,R6                ACC ← TIME (6 SCANS)
 023F  AA         64             MOV R2,A                T1 ← 6 SCAN TIMES
 0240  F9         65             MOV A,R1                A ← TLO
 0241  37         66             CPL A                   GET 2'S COMP. OF TLO
 0242  17         67             INC A
 0243  6A         68             ADD A,R2                A ← T1 ← TLO
 0244  6A         69             ADD A,R2                A ← T1 ← T1 ← TLO
 0245  AB         70             MOV R3,A                THI ← T1 ← T1 ← TLO (8 SCANS)
 0246  FC         71             MOV A,R4                A ← STATE FLAGS
 0247  D3  20     72             XRL A,     H20              ODD1 ← 1
 0249  AC         73             MOV R4,A
 024A  44  03     74             JMP        WAIT         JUMP TO CHECK BUFFER
                  75    * DETERMINE READ DIRECTION FROM DIRECTION BIT
 024C  34  18     76    DIRECT   CALL       BITID        DETERMINE BIT VALUE
 024E  C5         77             SEL RB0
 024F  FF         78             MOV A,R7
 0250  F7         79             RCL A                   PUT BIT VALUE INTO BYTE
 0251  AF         80             MOV R7,A
 0252  D5         81             SEL RB1
```

-continued

ATTACHMENTS

| INST LOCN | OP CD | OP ND | STMT NO | LABEL | MNEMONIC | *OPERAND | COMMENT |
|---|---|---|---|---|---|---|---|
| 0253 | 1C | | 82 | | INC R4 | | |
| 0254 | 12 | 59 | 83 | | JB0 | REVR | JUMP IF BIT VALUE = 1 (REVERSE READ) |
| 0256 | 85 | | 84 | | CLR F0 | | ELSE DIRECTION FLAG ← 0 (FORWARD READ) |
| 0257 | 44 | 03 | 85 | | JMP | WAIT | JUMP TO CHECK BUFFER |
| 0259 | 85 | | 86 | REVR | CLR F0 | | DIRECTION FLAG ← 1 (REVERSE READ) |
| 025A | 95 | | 87 | | CPL F0 | | |
| 025B | 44 | 03 | 88 | | JMP | WAIT | JUMP TO CHECK BUFFER |
| | | | | | END | | |

********** INSTR **********
ORIGIN: 112

| INST LOCN | OP CD | OP ND | STMT NO | LABEL | MNEMONIC | *OPERAND | COMMENT |
|---|---|---|---|---|---|---|---|
| | | | 1 | INSTR | ORG | H70 | |
| | | | 2 | ********************************************************************** |
| | | | 3 | ***** | | INTERRUPT SERVICE ROUTINE | ***** |
| | | | 4 | ********************************************************************** |
| | | | 5 | * | | | |
| | | | 6 | * INSTR IS CALLED UPON A TRANSITION IN CODE |
| | | | 7 | * | | | |
| 0070 | C5 | | 8 | | SEL RB0 | | |
| 0071 | AD | | 9 | | MOV R5,A | | HOLD ACC IN R5 |
| 0072 | 08 | | 10 | | INS A,BUS | | DUMMY READ TO CLEAR INT LATCH |
| 0073 | 42 | | 11 | | MOV A,T | | ACC ← COUNT |
| 0074 | 2B | | 12 | | XCH A,R3 | | ACC ← DELTA, DELTA ← COUNT |
| 0075 | 6B | | 13 | | ADD A,R3 | | ACC ← COUNT + DELTA |
| 0076 | D5 | | 14 | | SEL RB1 | | |
| 0077 | AF | | 15 | | MOV R7,A | | TIME(BUF) ← COUNT + DELTA |
| 0078 | C5 | | 16 | | SEL RB0 | | |
| 0079 | 27 | | 17 | | CLR A | | RESET TIMER/COUNTER TO ZERO |
| 007A | 62 | | 18 | | MOV T,A | | |
| 007B | 45 | | 19 | | STRT CNT | | |
| 007C | A5 | | 20 | | CLR F1 | | WORKFLAG ← 1 |
| 007D | B5 | | 21 | | CPL F1 | | |
| 007E | FD | | 22 | | MOV A,R5 | | RESTORE ACC FROM R5 |
| 007F | 93 | | 23 | | RETR | | RETURN AND RESTORE |
| | | | | | END | | |

********** TOVFR **********
ORIGIN: 133

| INST LOCN | OP CD | OP ND | STMT NO | LABEL | MNEMONIC | *OPERAND | COMMENT |
|---|---|---|---|---|---|---|---|
| | | | 1 | TOVFR | ORG | H85 | |
| | | | 2 | ********************************************************************** |
| | | | 3 | ***** | | TIMER OVERFLOW ROUTINE | ***** |
| | | | 4 | ********************************************************************** |
| | | | 5 | * | | | |
| | | | 6 | * TOVFR ROUTINE CALLED UPON TIMER OVERFLOW SIGNIFYING DEFAULT END |
| | | | 7 | * | | | |
| 0085 | 15 | | 8 | | DIS I | | DISABLE INTERRUPT |
| 0086 | 35 | | 9 | | DIS, TCNTI | | DIABLE TIMER/COUNTER INTERRUPT |
| 0087 | 65 | | 10 | | STOP TCNT | | STOP COUNTER |
| 0088 | D5 | | 11 | | SEL RB1 | | |
| 0089 | FC | | 12 | | MOV A,R4 | | ACC ← STATE FLAGS |
| 008A | 92 | 92 | 13 | | JB4 | CHECK | JUMP IF START OF LINE CODE READ |
| | | | 14 | * ELSE START WAS BAD |
| 008C | 23 | C2 | 15 | | MOV A, | HC2 | OUTPUT 'BAD START' STATUS WORD |
| 008E | 39 | | 16 | | OUTL P1,A | | |
| 008F | 02 | | 17 | | OUTL BUS,A | | |
| 0090 | 04 | B9 | 18 | | JMP | STOP | END CODE |
| | | | 19 | * | | | |
| | | | 20 | * CHECK FOR ERRORS IN LINE READ |
| 0092 | 43 | 20 | 21 | CHECK | ORL A, | H20 | END FLAG ← 1 |
| 0094 | AC | | 22 | | MOV R4,A | | |
| 0095 | C5 | | 23 | | SEL RB0 | | |
| 0096 | FE | | 24 | | MOV A,R6 | | ACC ← BITCNT |
| 0097 | 72 | 9F | 25 | | JB3 | FULL | JUMP IF FULL BYTE WAS OUTPUT LAST |
| | | | 26 | * ELSE PARTIAL BYTE AT END (NON-INTEGRAL NUMBER OF BYTES) |
| 0099 | 23 | C4 | 27 | | MOV A, | HC4 | ELSE OUTPUT 'PARTIAL BYTE' STATUS |
| 009B | 39 | | 28 | | OUTL P1,A | | |
| 009C | 02 | | 29 | | OUTL BUS,A | | |
| 009D | 04 | B9 | 30 | | JMP | STOP | JUMP TO STOP DECODING |
| | | | 31 | * | | | |
| | | | 32 | * CHECK IF LAST BYTE WAS END OF LINE CODE |
| 009F | FF | | 33 | FULL | MOV A,R7 | | ACC ← LAST BYTE |
| 00A0 | D5 | | 34 | | SEL RB1 | | |
| 00A1 | B6 | AF | 35 | | JF0 | REVR | JUMP IF REVERSE READ |
| 00A3 | 53 | 0F | 36 | | ANL A, | H0F | MASK BYTE |
| 00A5 | D3 | 08 | 37 | | XRL A, | H08 | |
| 00A7 | C6 | B5 | 38 | | JZ | GOOD | JUMP IF BYTE = H'X8' |
| | | | 39 | * ELSE END OF LINE CODE NOT READ CORRECTLY |

ATTACHMENTS

| INST LOCN | OP CD | OP ND | STMT NO | LABEL | MNEMONIC | *OPERAND | COMMENT |
|---|---|---|---|---|---|---|---|
| 00A9 | 23 | C1 | 40 | BAD | MOV A, | HC1 | OUTPUT 'BAD END' STATUS WORD |
| 00AB | 39 | | 41 | | OUTL P1,A | | |
| 00AC | 02 | | 42 | | OUTL BUS,A | | |
| 00AD | 04 | B9 | 43 | | JMP | STOP | JUMP TO STOP DECODING |
| | | | 44 | * CHECK IF LAST BYTE WAS A VALID REVERSE READ END CODE | | | |
| 00AF | 53 | F0 | 45 | REVR | ANL A, | HF0 | MASK BYTE |
| 00B1 | D3 | 10 | 46 | | XRL A, | H10 | |
| 00B3 | 96 | A9 | 47 | | JNZ | BAD | JUMP IF BYTE ≈ H'1X' |
| | | | 48 | * ELSE LINE READ WAS GOOD | | | |
| 00B5 | 23 | 84 | 49 | GOOD | MOV A, | H84 | OUTPUT 'LINE GOOD' STATUS |
| 00B7 | 39 | | 50 | | OUTL P1,A | | |
| 00B8 | 02 | | 51 | | OUTL BUS,A | | |
| | | | 52 | * END OF CODE FOUND -- STOP DECODING | | | |
| 00B9 | 04 | B9 | 53 | STOP | JMP | STOP | LOOP FOR RESET |
| | | | | | END | | |

********** BITIDM ***********

| INST LOCN | OP CD | OP ND | STMT NO | LABEL | MNEMONIC | *OPERAND | COMMENT |
|---|---|---|---|---|---|---|---|
| | | | 1 | BITIDM | ORG | 280 | |
| | | | 2 | * BIT ID BY MINIMUM DISTANCE AND SMOAK ALGORITHM | | | |
| | | | 3 | * CHECK FOR ODD OR EVEN NUMBER OF 1'S | | | |
| 0118 | FC | | 4 | | MOV A,R4 | | A ← STATE FLAGS |
| 0119 | B2 | 2B | 5 | | JB5 | HCHK | CHECK FOR 0H IF ODD1 = 1 |
| 011B | F9 | | 6 | | MOV A,R1 | | A ← C0 |
| 011C | 37 | | 7 | | CPL A | | |
| 011D | 17 | | 8 | | INC A | | A ← ⁻C0 |
| 011E | 6E | | 9 | | ADD A,R6 | | A ← T − C0 |
| 011F | 6E | | 10 | | ADD A,R6 | | A ← 2T − C0 |
| 0120 | A8 | | 11 | | MOV R0,A | | SAVE A |
| 0121 | FA | | 12 | | MOV A,R2 | | A ← C1 |
| 0122 | 37 | | 13 | | CPL A | | |
| 0123 | 17 | | 14 | | INC A | | A ← ⁻C1 |
| 0124 | 68 | | 15 | | ADD A,R0 | | A ← 2T − C0 − C1 |
| | | | 16 | * DECIDE BETWEEN 0L AND 1 | | | |
| 0125 | F6 | 3D | 17 | | JC | ONE | IF A ≧ 0, 1 DECODED |
| | | | 18 | * LOW ZERO DECODE | | | |
| 0127 | FE | | 19 | ZL | MOV A,R6 | | A ← T |
| 0128 | A9 | | 20 | | MOV R1,A | | C0 ← T |
| 0129 | 97 | | 21 | | CLR C | | CARRY ← 0 |
| 012A | 83 | | 22 | | RET | | |
| | | | 23 | * CHECK FOR 0H | | | |
| 012B | FA | | 24 | HCHK | MOV A,R2 | | A ← C1 |
| 012C | 37 | | 25 | | CPL A | | |
| 012D | 17 | | 26 | | INC A | | A ← ⁻C1 |
| 012E | 6E | | 27 | | ADD A,R6 | | A ← T − C1 |
| 012F | 6E | | 28 | | ADD A,R6 | | A ← 2T − C1 |
| 0130 | A8 | | 29 | | MOV R0,A | | SAVE A |
| 0131 | FB | | 30 | | MOV A,R3 | | A ← C2 |
| 0132 | 37 | | 31 | | CPL A | | |
| 0133 | 17 | | 32 | | INC A | | A ← ⁻C2 |
| 0134 | 68 | | 33 | | ADD A,R0 | | A ← 2T − C1 − C2 |
| 0135 | C6 | 3D | 34 | | JZ | ONE | |
| 0137 | E6 | 3D | 35 | | JNC | ONE | IF A ≦ 0, 1 DECODED |
| | | | 36 | * HIGH ZERO DECODE | | | |
| 0139 | FE | | 37 | | MOV A,R6 | | A ← T |
| 013A | AB | | 38 | | MOV R3,A | | C2 ← T |
| 013B | 97 | | 39 | | CLR C | | CARRY ← 0 |
| | | | 40 | * ONE DECODE | | | |
| 013C | 83 | | 41 | | RET | | |
| 013D | FC | | 42 | ONE | MOV A,R4 | | A ← STATE FLAGS |
| 013E | D3 | 20 | 43 | | XRL A, | H20 | COMPLIMENT ODD1 |
| 0140 | AC | | 44 | | MOV R4,A | | |
| 0141 | FE | | 45 | | MOV A,R6 | | A ← T |
| 0142 | AA | | 46 | | MOV R2,A | | C1 ← T |
| 0143 | 97 | | 47 | | CLR C | | |
| 0144 | A7 | | 48 | | CPL C | | CARRY ← 1 |
| 0145 | 83 | | 49 | | RET | | |
| | | | 50 | * HIGH ZERO DECODE | | | |
| 0146 | FE | | 51 | ZH | MOV A,R6 | | A ← T |
| 0147 | AB | | 52 | | MOV R3,A | | CH ← T |
| 0148 | 97 | | 53 | | CLR C | | BIT ← 0 |
| 0149 | 83 | | 54 | | RET | | |
| | | | | | END | | |

********** BUILD ***********

ORIGIN: 848

| INST LOCN | OP CD | OP ND | STMT NO | LABEL | MNEMONIC | *OPERAND | COMMENT |
|---|---|---|---|---|---|---|---|
| | | | 1 | BUILD | ORG | H350 | |
| | | | 2 | ************************************************************************************ | | | |

ATTACHMENTS

```
                    3    *****                BUILD ROUTINE                        *****
                    4    ******************************************************************
                    5    *
                    6    * BUILD ROUTINE CONSTRUCTS A BYTE AND OUTPUTS IT WHEN COMPLETE
                    7    *
0350  C5            8          SEL  RB0
0351  FF            9          MOV  A,R7                ACC ← BYTE
0352  B6 60        10          JF0       REVR           JUMP IF REVERSE READ
                   11    * ELSE READ DIRECTION IS FORWARD
0354  F7           12          RLC  A                   PUT BIT VALUE INTO BYTE
0355  AF           13          MOV  R7,A
0356  EE 5F        14          DJNZ R6   END1           DEC BITCNT AND JUMP IF BYTE NOT FULL
0358  99 82        15          ANL  P1,  H82           ELSE OUTPUT 'DATA READ' STATUS
035A  89 82        16          ORL  P1,  H82
035C  02           17          OUTL BUS,A               OUT BYTE ON BUS
035D  BE 08        18          MOV  R6,  H08           REINITIALIZE BITCNT TO 8
035F  83           19    END1  RET                      RETURN
                   20    * READ DIRECTION IS REVERSE
0360  67           21    REVR  RRC  A                   PUT BIT VALUE INTO BYTE
0361  AF           22          MOV  R7,A
0362  EE 6B        23          DJNZ R6   END2           DEC BITCNT AND JUMP IF BYTE NOT FULL
0364  99 82        24          ANL  P1,  H82           ELSE OUTPUT 'DATA READ' STATUS
0366  89 82        25          ORL  P1,  H82
0368  02           26          OUTL BUS,A               OUTPUT BYTE TO BUS
0369  BE 08        27          MOV  R6,  H08           REINITIALIZE BITCNT
036B  83           28    END2  RET                      RETURN
                             END
```

NOTE:
THE ATTACHED PROGRAMS ARE WRITTEN IN THE ASSEMBLER LANGUAGE FOR THE INTEL 8748, EXCEPT FOR THE INSTRUCTION ORG WHICH INDICATED BYTE ADDRESS REFERENCE IN THE MEMORY.

What is claimed is:

1. A decoding process for decoding graphical bar coded information, coded such that three relative distances between consecutive similar transitions, from mark to space and space to mark are used to characterize the binary coded data 0 and 1 in such a manner that one distance is used to code one binary value and two distances, i.e., a long distance and a short distance are used to code the other binary value, said process involving the following operations for decoding the $(i+1)^{th}$ coded bit:

measuring the distance between graphic edges characterizing said $(i+1)^{th}$ bit;

comparing the measured distance to a first or to a second predetermined threshold level depending whether the number of decoded binary one bits up to and including the $i^{th}$ bit was even or odd;

selecting the value of the $(i+1)^{th}$ bit based on the result of this comparison; and, updating at least one of the threshold values based on the last bit value selected.

2. A decoding process for decoding graphical bar coded information according to claim 1, which further includes using a predetermined sequence to initiate the decoding process by initiating the threshold values.

3. A decoding process according to claim 2 characterized in that said first and second threshold levels are generated each from the addition of two out of three dynamically set values.

4. A decoding process according to claim 3 characterized in that the threshold is updated after each bit decoding, according to the value of the distance characterizing the bit just decoded.

5. A system for dynamically decoding ETAB bar coded information using one bit distance for coding one of the binary bit values and two distances for coding the other, said system including:

input means;

scanning means connected to said input means for scanning the bar coded information and for generating an analog time varying signal representative of the mark to space and space to mark transitions;

measuring means connected to said scanning means for sequentially determining from said time varying signal the measures of the distances between consecutive similar transitions;

decoding means connected to said measuring means for decoding the $(i+1)^{th}$ bit contained in said ETAB bar coded information, said decoding means including:

threshold means for setting a first and a second threshold levels;

first comparing means connected to said measuring means and to said threshold means, for comparing the distance between two consecutive similar transitions relative to said $(i+1)^{th}$ bit, to said first threshold whenever the number of decoded bits of said one of the binary bit values was even up to and including the $i^{th}$ bit;

second comparing means connected to said measuring means and to said threshold means, for comparing the distance between two consecutive similar transitions relative to said $(i+1)^{th}$ bit to said second threshold whenever the number of decoded bits of said one of the binary bit values was odd up to and including the $i^{th}$ bit;

first discriminating means connected to said first comparing means for discriminating between the binary value coded with one distance and one of the binary values coded with two distances, depending upon the output of said first comparing means for characterizing said $(i+1)^{th}$ bit;

second discriminating means connected to said second comparing means for discriminating between the binary value coded with one distance and the other one of the binary values coded with two distances, depending upon the output of said second comparing means for characterizing said $(i+1)^{th}$ bit; and, updating means for updating at least one of said dynamic threshold levels in accordance with the distance characterizing the $(i+1)^{th}$ bit.

6. A system according to claim 5 characterized in that said measuring means includes:
   a bit time generator control logic provided with at least one input and at least a first, a second, a third, and a fourth logic outputs;
   a first counter driven by a first clock and having an input connected to said first logic output, and an output;
   a second counter driven by said first clock and having an input connected to said second logic output, and an output;
   a first register having one input connected to said first counter output and another input connected to said third logic output; and,
   a second register having one input connected to said second counter output, and another input connected to said fourth logic output.

7. A system according to claim 6 and further including overflow detection means connected to said first counter output.

8. A system for dynamically decoding ETAB bar coded information according to claim 7 and characterized in that said bit generator control logic is further provided with a fifth and a sixth outputs.

9. A system for dynamically decoding ETAB bar coded information according to claim 5 and characterized in that said threshold means for setting a first and a second dynamic threshold are made of three registers for storing three predetermined distance values.

10. A decoding system for decoding ETAB bar coded information using one bit distance to code one of the conventional binary bit values and two distances to code the other bit value, said system including:
    scanning and reshaping means for scanning the bar coded information and for deriving therefrom information relative to location of bar to space and space to bar transitions;
    clock means;
    counting means responsive to said scanning and reshaping means and to said clock means to determine the current bit time information;
    first storage means responsive to said counting means for storing said current bit time information;
    second storage means for storing a first and a second predetermined threshold values;
    flag storing means for storing a flag indicating whether the number of bits of said one of the conventional binary bit values previously decoded was odd or even;
    computing means including means responsive to said flag for selecting one of said first and second predetermined threshold values;
    means for subtracting it from said current bit time information and for deriving therefrom the decoded current binary bit value;
    first updating means responsive to said computing means and to said counting means for updating, at least partially, the contents of said second storage means;
    second updating means, responsive to said accumulating means for updating said flag storing means;
    clearing means for clearing said computing means.

11. A decoding system according to claim 10 wherein said second storage means includes a first, a second and a third classifier registers and means for feeding said registers.

12. A decoding system according to claim 11 wherein said first updating means includes means responsive to the value of the currently decoded bit for feeding at least one of said classifier register with the count measuring the bit time just decoded.

13. A decoding system according to claim 12 wherein said computing means includes:
    an arithmetic and logic unit (ALU);
    means responsive to said flag to feed the contents of two out of the three classifier registers into said ALU and to drive said ALU to perform a complementing function;
    accumulating means responsive to said ALU and to said first storage means for accumulating the contents of said ALU to the content of said first storage means and for deriving the decoded bit valve from the contents of said accumulating means.

* * * * *